United States Patent Office 3,499,915
Patented Mar. 10, 1970

3,499,915
SULFONATED 1 - ALKYLAMINO - 4 - ACYLAMINO-METHYLARALKYLAMINO-ANTHRAQUINONES
Hans Rudolf Schwander, Unterm Schellenberg, Anton Zenhausern, Reinach, and Peter Hindermann, Bottmingen, Switzerland, assignors to J. R. Geigy A.G., Basel, Switzerland
No Drawing. Continuation-in-part of application Ser. No. 514,692, Dec. 17, 1965. This application June 12, 1967, Ser. No. 645,514
Claims priority, application Switzerland, June 17, 1966, 8,841/66
Int. Cl. C09b 1/36
U.S. Cl. 260—372          10 Claims

ABSTRACT OF THE DISCLOSURE 1,4-diamino-anthraquinone dyes which are substituted at the amino nitrogen in 1-position by a secondary alkyl, or in certain cases by a cycloalkyl group, and which are substituted at the amino nitrogen in 4-position by an arylenealkyl substituent the aryl moiety of which is substituted by —$SO_3H$, or by a fiber-reactive grouping especially of the —CCl=$CH_2$ or —$CH_2$Cl type, which fiber-reactive grouping is linked to the said aryl moiety via a —CO—NH—$CH_2$— type (Einhorn) bridge, or by a non-fiber-reactive, unsubstituted alkyl, a cycloalkyl, alkoxy or cycloalkoxy radical or a non-fiber-reactive aryl radical linked to the above-mentioned aryl moiety via the aforesaid —CO—NH—$CH_2$—bridge; these dyestuffs being useful as substantive, and as far as they possess fiber-reactive groupings, as reactive polyamide dyes.

RELATED APPLICATIONS

This application is a continuation-in-part of our pending patent application Ser. No. 514,692, filed Dec. 17, 1965.

DESCRIPTION OF THE INVENTION

First aspect

This invention relates in a first aspect to novel anthraquinone dyestuffs, their use in the dyeing and printing of textile fiber materials, especially of polyamide fiber materials, as well as to the materials colored with these dyestuffs.

In a second aspect, the invention relates to a novel process for the production of the aforesaid anthraquinone dyestuffs.

When dyeing textile materials which consist essentially of wool, silk or man-made polyamide fibers by the exhaustion process, it is often desirable to do so from an acid bath.

Acid anthraquinone dyestuffs suitable for this purpose are known; they dye the above-mentioned polyamide fiber materials in the range of green, blue or violet shades.

Dyeings obtained on the above-mentioned fiber materials with the best known anthraquinone dyestuffs especially of the 1-amino-4-arylamino-anthraquinone type show satisfactory wet fastness properties, especially fastness to milling and to potting, and also good light fastness, but usually draw irreversibly on to the fibers and have poor migration power; level dyeings must thus be due to level strike of these dyestuffs which is only obtainable by the exhaust method, if such critical conditions as temperature and rate of circulation of the dye liquor are strictly controlled.

To obtain level dyeings with the known anthraquinone dyes of satisfactory fastness to potting and milling is particularly difficult in the dyeing of piece goods. The required strict control of temperature and rate of circulation of the dye bath in the machines in which such dyeing is usually carried out, e.g. in winch vats, is highly inconvenient and difficult to achieve.

On the other hand, hitherto known anthraquinone dyes of good migration and "equalizing" power are usually unsatisfactory in the dyeing of polyamide fibers because the wash fastness, fastness to milling, and/or fastness to potting leaves to be desired; often they are also of unsatisfactory light fastness and afford only dull shades.

A further problem exists in the production of green shades by combination of blue anthraquinone dyes with acid yellow dyes from other dyestuff classes (combination dyeing). For this purpose, the blue anthraquinone component, in order to be fully suitable for dyeing in mixtures with such acid yellow dyes, should be capable of drawing on the above-mentioned fibers from an acid and preferably a weakly acid bath, and it should possess, moreover, very good migration and "equalizing" power, and should afford, in mixture with the yellow component, green dyeings on the above-mentioned fibers which are of brilliant shade and good wet fastness properties.

It has further been observed that mixtures of known blue anthraquinone dyes in mixture with yellow dyes of other dyestuff classes, e.g. azo dyes, yield dyeings on the above-mentioned fiber materials, which possess less light fastness than the dyeings obtained on the same materials with the individual dyestuff components.

In order to avoid confusion, the term "equalizing power" (called "Egalisiervermögen" in German language textbooks) is used in this specification in lieu of the frequently used "levelling power," to distinguish properties of a dyestuff which lead to obtainment of level dyeings, such as good migration properties and reversible drawing on the fibers, from those leading to the obtainment of level dyeings with irreversibly drawing dyes due to a "level strike." Different international standard test methods are employed by dyers to test the two types of level dyeing.

By "wet fastness" is meant fastness to water or soap or synthetic detergents, or the like weakly or strongly alkaline media, including alkaline milling and potting, as well as fastness to sea-water and to perspiration. Blue acid anthraquinone dyes which fulfill satisfactorily all of the above requirements have not been known in the past.

Indeed, it has been a long-standing problem in the dyeing of polyamide fibers with anthraquinone dyes to provide such dyestuffs which show improved migration power and draw reversibly on to the fibers from an exhaustion bath, and thus show a good "equalizing" power, whereby level dyeings can be obtained by prolonged dyeing without requiring such strict controls as are necessary in the case of the hitherto known anthraquinone dyes. At the same time, the dyeings obtained with such dyestuffs should show brilliant shades of fully satisfactory wet fastness properties and good light fastness, even in combination dyeing.

Dyestuffs according to a first aspect of this invention, which satisfy these several requirements, especially in dyeing from an acid exhaustion bath, which have good "equalizing" and migrating powers and afford light fast, brilliant shades of good wet fastness properties, are dyestuffs falling under the formula

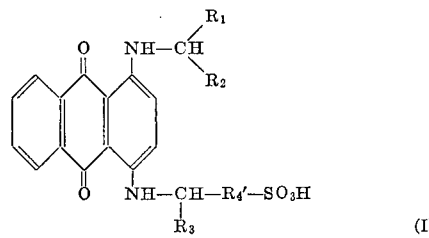

(III)

wherein each of $R_1$ and $R_2$ represents a lower alkyl group,
$R_3$ represents a lower alkyl group, and
$R_4'$ represents a divalent arylenealkyl group linked with its alkyl moiety to

and with its arylene moiety to the —$SO_3H$ group, and being unsubstituted or ring-substituted by lower alkyl and/or lower alkoxy groups and/or by halogen.

These dyestuffs according to the first aspect of the invention are suitable, in the order of importance, primarily for the dyeing and printing of synthetic polyamide fibers such as nylon or polyurethanes and, secondarily, for the dyeing and printing of natural polyamide fibers such as silk, leather and, particularly, wool. They draw level onto these fibers from a weakly acid to acid bath at higher temperatures and have good migratory and equalizing powers, dyeing wool and nylon equally well, without particularly strict control of dyeing conditions. The pure, brilliant greenish blue or blue dyeings so obtained, e.g. dyeings on wool or nylon, are distinguished by good light fastness and wet fastness properties, particularly fastness to water washing, potting, milling and perspiration. Moreover, the dyestuffs according to the invention are also suitable in admixture with other acid dyestuffs to attain combination dyeings, especially in green shades.

These dyestuffs are structurally distinguished from similar known dyestuffs by the presence of a relatively large number of alkyl carbon atoms, firstly as substituents in the amino nitrogen atom in 1-position at the anthraquinone nucleus, and secondly as part of the substituent of the amino group in 4-position at the same nucleus. The minimum number of carbon atoms in both alkyl portions of the molecule must be six. That thus substituted 1,4-diamino-anthraquinone dyes have good "equalizing" and migrating powers is very unexpected, since it is well known that substitution of, especially, phenylamino-anthraquinones with alkyl substituents of three and especially with five, six and more carbon atoms leads to dyes of high fastness to milling and potting, but accompanied by poor migrating and "equalizing" powers [cf. Venkataraman, "Synthetic Dyes" II, pp. 857–860 (1952)].

In spite of their satisfactory wet fastness properties and especially milling and potting fastness, the equalizing power of the dyestuffs falling under Formula III is most satisfactory.

Dyestuffs falling under Formula III, which possess particularly good all-round properties, are those wherein
$R_1$ and $R_2$ together contain from 2 to 6 carbon atoms, and especially those in which
$R_1$ represents the methyl group and
$R_2$ either the methyl or the ethyl group,
$R_3$ is advantageously the methyl, ethyl or isobutyl group,
$R_4'$ represents a phenylenealkyl group, and especially the benzylene or, still more preferred, the phenethylene group, unsubstituted or substituted by lower alkyl, preferably methyl or ethyl, or lower alkoxy, preferably methoxy or ethoxy; and/or substituted by halogen, particularly by fluorine, chlorine or bromine.

Preferred dyestuffs, because of particularly good wash fastness properties besides the above-mentioned excellent equalizing power, are those falling under Formula III which are of the formula

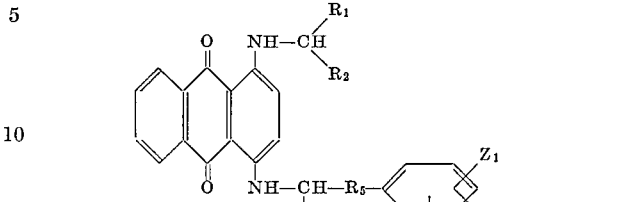

(III–A)

wherein each of $R_1$ and $R_2$ represents lower alkyl,
$R_3'$ represents alkyl of from 1 to 2 carbon atoms,
$R_5$ represents alkylene of from 1 to 2 carbon atoms, the sum of carbon atoms in $R_1$, $R_2$, $R_3'$ and $R_5$ ranging from five to eight,
$Z_1$ represents hydrogen, methyl, methoxy, chlorine or bromine, and
$Z_2$ represents hydrogen, chlorine, methyl or methoxy.

An optimal combination of wash fastness of their dyeings on nylon and equalizing power is shown by those dyestuffs of Formula III–A in which the sum of carbon atoms in $R_1$, $R_2$, $R_3'$ and $R_5$ is five to six, and $Z_1$ and $Z_2$ each represents hydrogen.

The unsulfonated dyestuffs of the formula

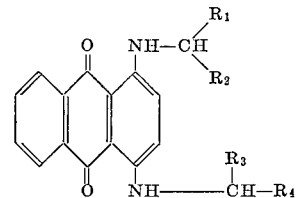

in which $R_1$, $R_2$ and $R_3$ have the meanings given hereinbefore, and $R_4$ has the meaning given the following Formula II, infra, are soluble in organic solvent such as alkylketones, e.g. acetone or methylethyl ketone or glycolalkylethers, e.g. Cellosolve; they are useful as disperse dyes in the dyeing of lacquers, and also in the dyeing of cellulose acetate fibers and especially in dope dyeing, in good light-fast and wet-fast shades.

The dyestuffs according to this aspect of the invention are produced by reacting an anthraquinone compound of the formula

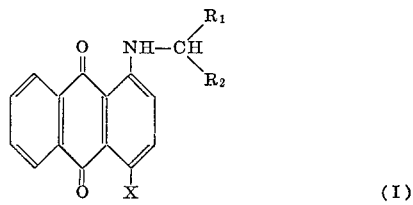

(I)

wherein each of $R_1$ and $R_2$ represents a lower alkyl group and X represents a substituent which can be exchanged for an aralkylamino group, for example chlorine, bromine, the hydroxyl or a lower alkoxy group, such as the methoxy group, or the nitro or amino group, chlorine or bromine being preferred,
with an aralkylamine or the formula

(II)

wherein

R₃ represents a lower alkyl group and R₄ represents an aralkyl group containing in the aryl nucleus at least one exchangeable hydrogen atom and being unsubstituted or ring-substituted by lower alkyl and/or lower alkoxy groups and/or halogen.
to form the corresponding 1-sec-alkylamino-4-aralkyl-amino-anthraquinone compound and sulfonating the latter compound to form a dyestuff of Formula III.

The starting materials of Formula I are obtained by known processes, e.g. by chlorinating or brominating or nitrating the corresponding 1-sec. alkylamino-anthraquinone compound and then, if necessary, exchanging the chlorine or bromine for the hydroxyl or a low alkoxy group, or reducing the nitro group to the amino group.

Starting compounds of Formula I wherein X is the hydroxyl group can also be obtained by reacting 1,4-dihydroxyanthraquinone or its leuco compound or a mixture of these compounds with the corresponding sec. alkylamine. These starting compounds can be reacted direct without isolation to form the intermediate product which after sulphonation corresponds to an end product of formula III.

The aralkylamines of Formula II are obtained, e.g. according to R. Leuckart [Ber. 18, 2341 (1885)] by reacting ketones of the formula

with ammonium formate or formamide and then splitting off the formyl group. In some cases, they can be obtained by condensing an aromatic aldehyde, e.g. benzaldehyde, with a dialkyl ketone such as acetone and reacting the arylidene ketone obtained in the saturated amine with ammonia and hydrogen in the presence of a catalyst according to G. Mignonac [C.r. 172/223 (1921)].

The reaction of the anthraquinone compound of Formula I with the aralkylamine of Formula II is performed, e.g. in the solution or melt of an excess of aralkylamine as defined, or in an organic solvent not taking part in the reaction. Examples of suitable solvents are aromatic hydrocarbons such as toluene, xylenes or naphthalene; or halogenated or nitrated aromatic hydrocarbons such as chlorobenzene, di- and trichlorobenzene or nitrobenzene, respectively; or halogenated aliphatic hydrocarbons such as trichloroethylene; alcohols, e.g. alkanols such as n-butanol, sec. butanol; or alkylene glycol monoalkyl ethers, e.g. ethylene glycol monomethyl or monoethyl ether; aromatic hydroxyl compounds, e.g. phenol and homologues thereof; or tertiary nitrogen bases such as pyridine.

If an anthraquinone compound of Formula I is used as starting material, wherein X is halogen, especially chlorine or bromine, the reaction is advantageously performed in the presence of copper or a copper compound such as copper-(I) chloride, and in the presence of an acid buffering agent and, preferably, at a raised temperature.

As acid buffering agent, particularly an excess of the aralkylamine as defined is used, optionally together with an alkali metal salt of a fatty acid such as sodium or potassium acetate or of a carbonic acid such as sodium bicarbonate or sodium carbonate, or with an alkali metal hydroxide such as sodium or potassium hydroxide, or with magnesium oxide. Also a tertiary amine such as triisopropanolamine can be used.

The 1-sec. alkylamino-4-aralkylamino-anthraquinone compound obtained is sulphonated by usual methods, for instance, in concentrated sulphuric acid or in oleum under mild conditions, e.g. at room temperature, or with chlorosulphonic acid in a solvent not taking part in the reaction.

A first modification of the process according to the invention consists in reacting an anthraquinone compound of Formula IV

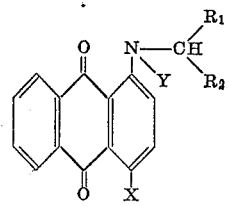

wherein Y represents an acyl radical and R₁, R₂ and X have the meanings given above, with an aralkylamine of Formula II to form the corresponding 1-(N-sec. alkyl-N-acylamino) - 4 - aralkylamino-anthraquinone compound and, in any order desired, saponifying and sulphonating this to form a dyestuff of Formula III.

Y represents, e.g. a carbacyl radical, especially an alkanoyl radical, e.g. the formyl, acetyl or propionyl radical, or an aroyl radical, such as the benzoyl radical, or an alkylsulphonyl radical such as the methylsulphonyl radical, or an arylsulphonyl radical such as the phenylsulphonyl or p-methylphenylsulphonyl radical. Preferably Y is the acetyl radical.

The starting materials of Formula IV are obtained by known methods, e.g. by reacting an anthraquinone compound of Formula I with an acylating agent introducing the radical Y, preferably with acetyl chloride or bromide or with acetanhydride.

The anthraquinone compounds of Formula IV are reacted with the aralkylamines of Formula II in analogous manner as described in the first process. The 1-(N-sec. alkyl-N-acylamino)-4-aralkylamino - anthraquinone compounds which are obtained in very good yields, are preferably first saponified and then sulphonated. Saponification is performed advantageously in aqueous acid medium, e.g. in aqueous sulphuric acid and, preferably, at a raised temperature. Sulphonation is performed as described in the first process. The quantitative reaction of an acylamino-anthraquinone compound of Formula IV with an aralkylamine of Formula II and the subsequent quantitative saponification of the acyl radical are unexpected, as normally when phenylamines are used instead of aralkylamines, insufficient yields are obtained on splitting off the acyl radical.

A second modification of the process according to the invention consists in reacting an anthraquinone compound of Formula V

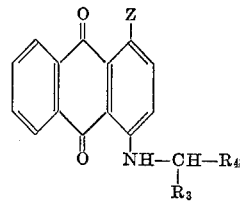

wherein Z represents a substituent which can be exchanged for a sec. alkylamino group and R₃ and R₄ have the meanings given above, with a (sec. alkyl)-amine of Formula VI

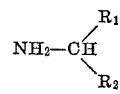

herein R₁ and R₂ have the meanings given above, to form the corresponding 1-sec. alkylamino - 4 - aralkylamino-anthraquinone compound and sulphonating this to form a dyestuff of Formula III. Z is like X especially chlorine or bromine.

Starting materials of Formula V are known or can be produced by known methods, e.g. by reacting 1-chloro- or 1-bromo- or 1-nitro- 4-alkoxy-anthraquinone with an aralkylamine of Formula II and, if desired, converting the chlorine or bromine into a low alkoxy group or reducing the nitro group to the amino group.

Starting compounds wherein Z is the hydroxyl group can be produced by reacting 1,4-dihydroxy-anthraquinone, its leuco compounds or a mixture of these compounds with an aralkylamine of Formula II. They can be reacted with the (sec. alkyl)-amine of Formula VI without having to be isolated and the reaction product obtained is then sulphonated.

A third modification of the process according to the invention consists in reacting an anthraquinone compound of Formula VII

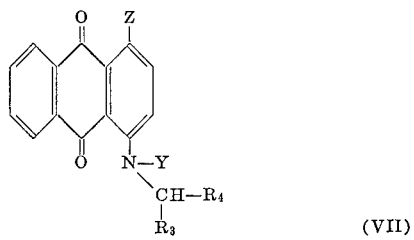

wherein $R_3$ and $R_4$ have the meanings given in Formula II, Y that given in Formula IV and Z that given in Formula V, with a (sec. alkyl)-amine of Formula VI to form the corresponding 1-sec. alkylamino-4-(N-aralkyl-N-acylamino)-anthraquinone compound and, in any order desired, saponifying and sulphonating this to form a dyestuff of Formula III.

The anthraquinone compounds of Formula VII are obtained by methods known per se, e.g. by reacting an anthraquinone compound of Formula V with an acylating agent introducing the radical Y, preferably with acetyl chloride or bromide or with acetanhydride.

The reaction of the acylamino-anthraquinone compound of Formula VII with the (sec. alkyl)-amine of Formula VI and the saponification of the 1-sec. alkylamino-4-(N-aralkyl-N-acyl-amino) - anthraquinone compound obtained are performed analogously to the process described in the first modification of the process according to the invention giving very good yields. The sulphonation is performed as described in the first process. In this case too, it is of advantage to first saponify and then sulphonate.

The end products of Formula III are advantageously isolated in the form of alkali metal salts, preferably as sodium salts. They are very soluble in water.

In the sulfonation of the unsulfonated dyestuffs of the formula

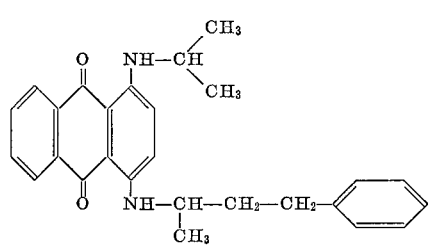

wherein $R_1$, $R_2$, $R_3$ and $R_4$ have the meanings given hereinbefore, one sulfonic acid group is introduced into the above dyestuff molecule.

Therefore, a sulfuric acid ranging from at least about 90% concentration, up to oleum having a content of 10% $SO_3$, or chlorosulfonic acid, may be used as sulfonating agent, and the temperature applied ranges from about 15° to 35° C., i.e. room temperature, but the progress of sulfonation should be controlled, which can easily be done by known techniques, e.g. by thin layer chromatography of control samples, or determination of the solubility of such samples, neutralized with sodium carbonate, in water.

The sulfonic acid group is attached to a carbon atom of the phenyl nucleus of the aralkyl moiety $R_4$ in the above Formula VIII. It will enter in ortho, meta- and para-position in proportions which depend on the absence or presence of substituents in that nucleus. The isomers thus constituting the dyestuffs falling under Formula III can be isolated by known chromatographic techniques and the position of the sulfonic acid group in each individual isomer could be determined by infrared and magneto-nuclear resonance spectra. However, since the isomers thus obtained would be of no superior dyeing properties and their isolation would be highly uneconomical, such separation would be without any technical value.

The term "lower" as used in this specification including the claims in connection with "alkyl" and "alkoxy" means that these radicals have from 1 to 4 carbon atoms.

The following non-limitative examples illustrate this aspect of the invention further. The temperatures are given therein in degrees centigrade. Where not otherwise stated, parts and percentages are given by weight.

Example 1

A mixture of 17.2 g. of 1-isopropylamino-4-bromo-anthraquinone, 19 g. of 1-phenyl-3-amino-butane, 5 g. of anhydrous potassium acetate, 0.005 g. of cuprous chloride, 0.10 ml. of water and 3 ml. of ethylene glycol monoethyl ether is stirred for 48 hours at a temperature of 110°. 60 ml. of n-butanol are added to the mixture which is then allowed to cool whereupon the reaction product precipitates. It is filtered off and washed, first with n-butanol and then with methanol. To further purify, the product is extracted hot with methanol and then recrystallised from n-butanol. The product of the formula

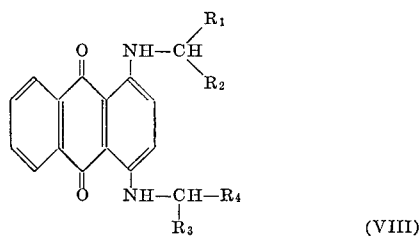

is obtained as a blue powder which melts at 134°. This is added to 10 times the amount of 96% sulphuric acid at 23-25°, the whole is stirred for 6 hours at this temperature and then poured onto a mixture of ice and sodium chloride whereupon the precipitated dyestuff is filtered off. The dyestuff is slurried in water, the pH is adjusted to 7 with sodium hydroxide solution, the whole is heated to 60°, whereupon the dyestuff partly dissolves, and 10% (calculated on the volume of the solution) of sodium chloride is added. The dyestuff precipitates. It is filtered off, washed with dilute sodium chloride solution and dried.

Nylon and wool are dyed from a weakly acid bath in pure blue shades which are wet and light fast. The dyestuff has good migratory powers and is suitable, in particular, for attaining pure green shades in combination with yellow dyestuffs.

If, instead of 17.2 g. of 1-isopropylamino-4-bromo-anthraquinone, 15 g. of 1-isopropylamino-4-chloro-anthraquinone are used (obtained by chlorinating 1-isopropyl-amino-anthraquinone with sulphuryl chloride in nitrobenzene) and otherwise the procedure given in Example 1 is followed, then the same dyestuff is obtained.

If, with the same procedure, instead of 1-isopropyl-amino - 4 - bromo-anthraquinone and 1-phenyl-3-amino-butane, equivalent amounts of the 1-sec. alkylamino-4-halogeno-anthraquinones (column 2) and phenyl-alkyl-amines (column 3) given in the following Table I are used, then dyestuffs having similar properties are obtained.

TABLE I

| No. | 1-sec. alkylamino-4-halogeno-anthraquinone | Phenyl-alkylamine |
|---|---|---|
| 2 | 1-(sec-butylamino: NH-CH(CH3)-CH3 with CH3)-4-bromo-anthraquinone | $NH_2-CH(CH_3)-CH(CH_3)-CH_2-C_6H_5$ |
| 3 | 1-(sec-butylamino: NH-CH(CH3)-CH2-CH3)-4-bromo-anthraquinone | $NH_2-CH(CH_3)-CH_2-C_6H_5$ |
| 4 | 1-isopropylamino-4-bromo-anthraquinone (NH-CH(CH3)-CH3) | $NH_2-CH(CH_2-CH(CH_3)_2)-CH_2-CH_2-C_6H_5$ |
| 5 | 1-(sec-butylamino: NH-CH(CH3)-CH2-CH3)-4-bromo-anthraquinone | $NH_2-CH(CH_2-C(CH_3)_3)-CH_2-CH_2-C_6H_5$ |

Example 6

A mixture of 19.3 g. of 1-(N-acetyl-N-isopropylamino)-4-bromo-anthraquinone and 16.2 g. of 1-phenyl-3-amino-butane is stirred for 20 hours at a temperature of 110°. The red melt obtained is then poured onto a mixture of 200 g. of ice and 200 ml. of 2 N hydrochloric acid whereupon the compound of the formula

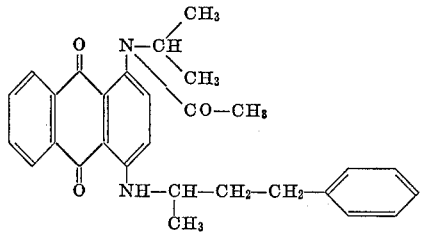

separates as a red resin. The aqueous hydrochloric acid phase is decanted from the intermediate product formed and the latter is dissolved by adding it in portions to 100 ml. of 80% sulphuric acid. This solution is stirred for 8 hours at a temperature of 50° and then poured onto ice whereupon the product described by the formula in Example 1 precipitates. It is purified by recrystallisation from n-butanol. Sulphonation is performed as described in Example 1.

If, with otherwise the same procedure, instead of 1-(N-acetyl - N - isopropylamino)-4-bromo-anthraquinone and 1-phenyl-3-amino-butane, equivalent amounts of the 1-(N-acetyl - N - sec. alkylamino) - 4 - halogeno-anthraquinones (column 2) or phenyl-alkylamines are used (column 3) of the following Table II, then dyestuffs having similar properties are obtained.

TABLE II

| No. | 1-(N-Acetyl-N-sec.alkylamino)-4-halogeno-anthraquinone | Phenyl-alkylamine |
|---|---|---|
| 7 | 1-(N-acetyl-N-isopropylamino)-4-bromo-anthraquinone (N with CH(CH3)2 and CO-CH3) | $C_6H_5-CH_2-CH(CH_3)-NH_2$ |

TABLE II—Continued

| No. | 1-(N-Acetyl-N-sec.alkylamino)-4-halogeno-anthraquinone | Phenyl-alkylamine |
|---|---|---|
| 8 | Same as above | 2-Cl-C6H4-CH2-CH(CH3)-NH2 |
| 9 | do | 3-Cl-C6H4-CH2-CH(CH3)-NH2 |
| 10 | do | 4-Cl-C6H4-CH2-CH(CH3)-NH2 |
| 11 | do | 4-H3C-C6H4-CH2-CH(CH3)-NH2 |
| 12 | do | 4-H3C-3-CH3-C6H3-CH2-CH(CH3)-NH2 |
| 13 | do | 2-OCH3-C6H4-CH2-CH(CH3)-NH2 |
| 14 | do | C6H5-CH2-CH(CH2CH3)-NH2 |
| 15 | do | 4-Cl-C6H4-CH2-CH(CH2CH3)-NH2 |
| 16 | do | 2-Cl-C6H4-CH2-CH(CH2CH3)-NH2 |
| 17 | do | 2-Cl-C6H4-CH2-CH2-CH(CH3)-NH2 |
| 18 | do | 3-Cl-C6H4-CH2-CH2-CH(CH3)-NH2 |
| 19 | do | 4-Cl-C6H4-CH2-CH2-CH(CH3)-NH2 |
| 20 | do | 2-CH3-C6H4-CH2-CH2-CH(CH3)-NH2 |
| 21 | do | 4-H3C-3-CH3-C6H3-CH2-CH2-CH(CH3)-NH2 |
| 22 | do | 4-H3C-C6H4-CH2-CH2-CH(CH3)-NH2 |
| 23 | do | 2,5-(CH3)2-C6H3-CH2-CH2-CH(CH3)-NH2 |
| 24 | do | 2-OCH3-C6H4-CH2-CH2-CH(CH3)-NH2 |

TABLE II—Continued
| No. | 1-(N-Acetyl-N-sec.alkylamino)-4-halogeno-anthraquinone | Phenyl-alkylamine |
|---|---|---|
| 25 | do | 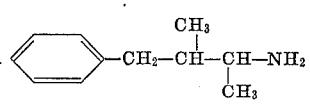 |
| 26 | do | 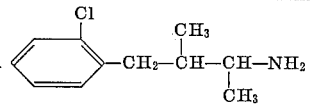 |
| 27 | do | 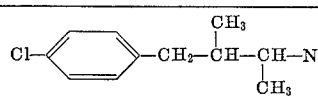 |
| 28 | do | 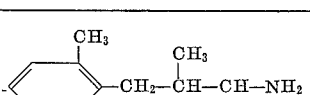 |
| 29 | do | 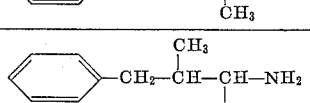 |
| 30 | do | 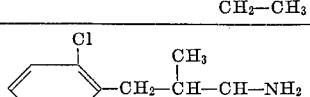 |
| 31 | do | 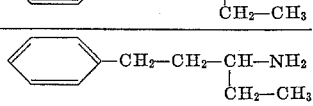 |
| 32 | do | 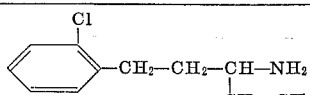 |
| 33 | do | 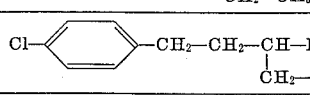 |
| 34 | 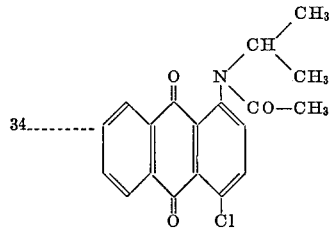 | 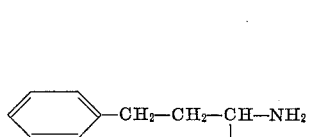 |
| 35 | Same as above | 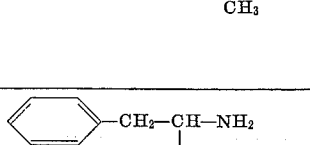 |
| 36 | do | 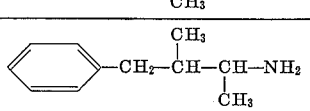 |
| 37 | do | 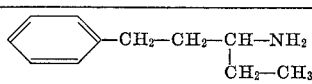 |
| 38 | 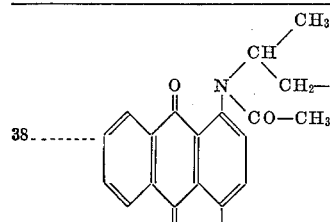 | 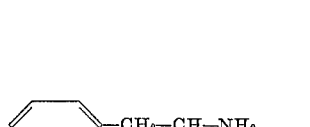 |

TABLE II—Continued

| No. | 1-(N-Acetyl-N-sec.alkylamino)-4-halogeno-anthraquinone | Phenyl-alkylamine |
|---|---|---|
| 39 | Same as above | 2-Cl-C$_6$H$_4$-CH$_2$-CH(CH$_3$)-NH$_2$ |
| 40 | do | 3-Cl-C$_6$H$_4$-CH$_2$-CH(CH$_3$)-NH$_2$ |
| 41 | do | 4-Cl-C$_6$H$_4$-CH$_2$-CH(CH$_3$)-NH$_2$ |
| 42 | do | 2-CH$_3$-C$_6$H$_4$-CH$_2$-CH(CH$_3$)-NH$_2$ |
| 43 | do | 4-CH$_3$-C$_6$H$_4$-CH$_2$-CH(CH$_3$)-NH$_2$ |
| 44 | do | 2-OCH$_3$-C$_6$H$_4$-CH$_2$-CH(CH$_3$)-NH$_2$ |
| 45 | do | C$_6$H$_5$-CH$_2$-CH$_2$-CH(CH$_3$)-NH$_2$ |
| 46 | do | 2-Cl-C$_6$H$_4$-CH$_2$-CH$_2$-CH(CH$_3$)-NH$_2$ |
| 47 | do | 4-Cl-C$_6$H$_4$-CH$_2$-CH$_2$-CH(CH$_3$)-NH$_2$ |
| 48 | do | 2-CH$_3$-C$_6$H$_4$-CH$_2$-CH$_2$-CH(CH$_3$)-NH$_2$ |
| 49 | do | 4-CH$_3$-C$_6$H$_4$-CH$_2$-CH$_2$-CH(CH$_3$)-NH$_2$ |
| 50 | do | C$_6$H$_5$-CH$_2$-CH(CH$_3$)-CH(CH$_3$)-NH$_2$ |
| 51 | do | C$_6$H$_5$-CH$_2$-CH$_2$-CH(CH$_2$-CH$_3$)-NH$_2$ |
| 52 | 1-[N-Acetyl-N-(1-methylpropyl)amino]-4-chloro-anthraquinone | C$_6$H$_5$-CH$_2$-CH(CH$_3$)-NH$_2$ |
| 53 | Same as above | C$_6$H$_5$-CH$_2$-CH$_2$-CH(CH$_3$)-NH$_2$ |
| 54 | do | C$_6$H$_5$-CH$_2$-CH(CH$_3$)-CH(CH$_3$)-NH$_2$ |
| 55 | do | C$_6$H$_5$-CH$_2$-CH$_2$-CH(CH$_2$-CH$_3$)-NH$_2$ |

TABLE II—Continued

| No. | 1-(N-Acetyl-N-sec.alkylamino)-4-halogeno-anthraquinone | Phenyl-alkylamine |
|---|---|---|
| 56 | 1-[N-(sec-butyl, CH(CH₃)CH₂CH₂CH₃)-N-acetylamino]-4-bromoanthraquinone | C₆H₅—CH₂—CH(CH₃)—NH₂ |
| 57 | Same as above | C₆H₅—CH₂—CH₂—CH(CH₃)—NH₂ |
| 58 | do | C₆H₅—CH₂—CH(CH₃)—CH(CH₃)—NH₂ |
| 59 | do | C₆H₅—CH₂—CH₂—CH(CH₂CH₃)—NH₂ |
| 60 | 1-[N-(3-pentyl, CH(CH₂CH₃)₂)-N-acetylamino]-4-bromoanthraquinone | C₆H₅—CH₂—CH(CH₃)—NH— |
| 61 | Same as above | C₆H₅—CH₂—CH₂—CH(CH₃)—NH₂ |
| 62 | do | C₆H₅—CH₂—CH(CH₃)—CH(CH₃)—NH₂ |
| 63 | do | C₆H₅—CH₂—CH₂—CH(CH₂CH₃)—NH₂ |
| 64 | 1-[N-(2,3-dimethyl-2-butyl type, CH(CH₃)CH(CH₃)₂)-N-acetylamino]-4-bromoanthraquinone | C₆H₅—CH₂—CH(CH₃)—NH₂ |
| 65 | Same as above | C₆H₅—CH₂—CH₂—CH(CH₃)—NH₂ |
| 66 | do | C₆H₅—CH₂—CH(CH₃)—CH(CH₃)—NH₂ |
| 67 | do | C₆H₅—CH₂—CH₂—CH(CH₂CH₃)—NH₂ |
| 68 | 1-[N-(sec-butyl, CH(CH₃)CH₂CH₃)-N-acetylamino]-4-chloroanthraquinone | C₆H₅—CH₂—CH₂—CH(CH₃)—NH₂ |

TABLE II—Continued

| No. | 1-(N-Acetyl-N-sec.alkylamino)-4-halogeno-anthraquinone | Phenyl-alkylamine |
|---|---|---|
| 69 | Same as above | Ph—CH$_2$—CH(CH$_3$)—NH$_2$ |
| 70 | 1-[N-isopropyl-N-(benzoyl)amino]-4-bromoanthraquinone | Ph—CH$_2$—CH(CH$_2$CH$_3$)—CH—NH$_2$ |
| 71 | 1-[N-isopropyl-N-(methylsulfonyl)amino]-4-bromoanthraquinone | Ph—CH$_2$—CH$_2$—CH(CH$_3$)—NH$_2$ |
| 72 | 1-[N-isopropyl-N-(phenylsulfonyl)amino]-4-bromoanthraquinone | Ph—CH$_2$—CH$_2$—CH(CH$_3$)—NH$_2$ |
| 73 | 1-[N-isopropyl-N-(p-tolylsulfonyl)amino]-4-bromoanthraquinone | Ph—CH$_2$—CH$_2$—CH(CH$_3$)—NH$_2$ |
| 74 | 1-[N-isopropyl-N-acetylamino]-4-bromoanthraquinone | Br—C$_6$H$_4$—CH$_2$—CH(CH$_3$)—NH$_2$ |
| 75 | 1-[N-isopropyl-N-propionylamino]-4-bromoanthraquinone | H$_5$C$_2$O—C$_6$H$_4$—CH$_2$—CH(CH$_3$)—NH$_2$ |

TABLE II—Continued

| No. | 1-(N-Acetyl-N-sec.alkylamino)-4-halogeno-anthraquinone | Phenyl-alkylamine |
|---|---|---|
| 76 | 1-(N-acetyl-N-sec-butylamino)-4-bromo-anthraquinone (structure: anthraquinone with N(COCH$_3$)CH(CH$_3$)CH$_2$-CH$_3$ at position 1 and Br at position 4) | $CH_3$—C$_6$H$_3$(Br)—CH$_2$—CH(CH$_3$)—NH$_2$ |
| 77 | 1-(N-acetyl-N-isopropylamino)-4-bromo-anthraquinone (structure: anthraquinone with N(COCH$_3$)CH(CH$_3$)$_2$ at position 1 and Br at position 4) | $H_3C_2O$—C$_6$H$_3$(Br)—CH$_2$—CH$_2$—CH(CH$_3$)—NH$_2$ |
| 78 | Same as above | Br—C$_6$H$_4$—CH$_2$—CH$_2$—CH(CH$_3$)—NH$_2$ |
| 79 | 1-(N-acetyl-N-sec-butylamino)-4-bromo-anthraquinone (structure: anthraquinone with N(COCH$_3$)CH(CH$_3$)CH$_2$-CH$_3$ at position 1 and Br at position 4) | Cl—C$_6$H$_3$(Cl)—CH$_2$—CH$_2$—CH(CH$_3$)—NH$_2$ |

Example 80

Mixture of 12 g. of 1-(N-sec. butylamino)-4-hydroxy-anthraquinone (obtained by reacting sec. butylamine with leuco-1,4-dihydroxy-anthraquinone), 18 g. of 1-phenyl-3-amino butane, 40 g. of phenol and 9 g. of zinc dust is stirred for 18 hours at a temperature of 90° whereupon 2 N hydrochloric acid is added to the reaction mixture until it has a strong acid reaction. The phenol is then removed by steam distillation. The precipitated reaction product which remains is filtered off, washed first with 2 N hydrochloric acid and then with water and dried, whereupon a blue powder is obtained. The pure product of the formula

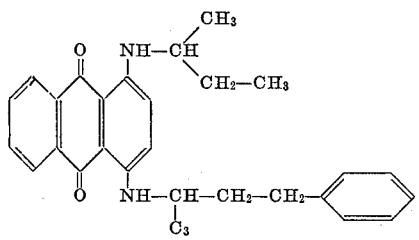

is obtained by chromatography on an aluminium oxide column followed by recrystallisation. It melts at 104°. This product is added to 96% sulphuric acid at 25° and sulphonated for 6 hours at this temperature. The dyestuff obtained has properties similar to those of the product described in Example 1.

If instead of 1-(N-sec. butylamino)-4-hydroxy-anthraquinone, the equivalent amount of 1-(N-sec. butylamino)-4-amino-anthraquinone [obtained by reduction from 1-(N-sec. butylamino)-4-nitro-anthraquinone] is used with otherwise the same procedure, the anthraquinone compound of the above formula is obtained which is sulphonated as described in Example 80.

Example 81

A mixture of 30 g. of 1-(N-isopropylamino)-4-methoxy-anthraquinone [obtained by methylation of 1-(N-isopropylamino)-4-hydroxy-anthraquinone] and 50 g. of 1-phenyl-2-methyl-3-aminobutane is stirred for 24 hours at a temperature of 150°. After cooling, the mixture is diluted with 250 ml. of methanol, the precipitated product is filtered off, washed with methanol and recrystallised from n-butanol. The product of the formula (structure: 1-(N-isopropylamino)-4-[N-(1-methyl-3-phenyl-2-methylpropyl)amino]-anthraquinone)

is obtained which is sulphonated as described in Example 1. The dyestuff obtained has good migratory powers and dyes nylon and wool from a weakly acid bath in pure blue shades which are wet and light fast.

If instead of 1-(N-isopropylamino)-4-methoxy-anthraquinone equivalent amounts of 1-(N-isopropylamino)-4-nitro-anthraquinone are used (obtained by reacting 1-methoxy-4-nitro-anthraquinone with isopropylamine) and otherwise the procedure described in Example 81 is followed, then the same dyestuff is obtained.

Example 82

A mixture of 39 g. of the compound of the formula (structure: 1-chloro-4-[N-(1-methyl-3-phenylpropyl)amino]-anthraquinone)

(obtained by reacting 1-chloro-4-methoxy-anthraquinone with 1-phenyl-3-amino-butane), 30 g. of 3-aminopentane, 10 g. of anhydrous potassium acetate, 0.01 g. of cuprous chloride, 0.3 ml. of water and 50 ml. of n-butanol are stirred in an autoclave for 48 hours at a temperature of 120°. After cooling, 200 ml. of methanol are poured slowly into the mixture while stirring, whereupon the product formed precipitates. This is filtered off, washed with methanol, then with hot 2 N hydrochloric acid and finally with water and dried. By recrystallisation from n-butanol, the product of the formula

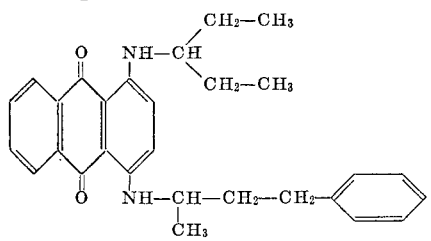

is obtained which is sulphonated as described in Example 1. A dyestuff is obtained which dyes nylon and wool from a weakly acid bath in wash fast blue shades.

Example 83

If, instead of 1-chloro-4-[4'-phenylbutyl-(2')-amino]-anthraquinone, the corresponding 1-bromo-anthraquinone compound is used (obtained by reacting 1-bromo-4-methoxy-anthraquinone with 1-phenyl-3-aminobutane) and otherwise the same procedure as given in Example 82 is followed, then the same dyestuff is obtained.

Example 84

A mixture of 54 g. of the compound of the formula

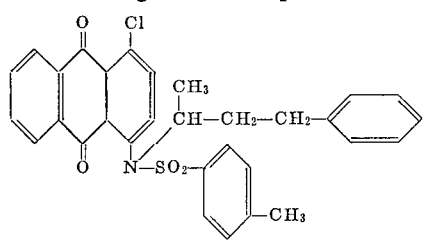

(obtained by tosylating the corresponding 1-chloro-4-aralkyl-amino-anthraquinone compound), 30 g. of 2-amino-3-methyl-butane and 100 ml. of n-butanol is stirred in an autoclave for 24 hours at a temperature of 110° whereupon the reaction mixture is subjected to steam distillation. The residue, a red resin, is added in portions to 600 g. of 80% sulphuric acid and the solution is stirred for 10 hours at a temperature of 60° whereupon the tosyl radical is split off. The solution is poured onto ice, the precipitated product is filtered off and recrystallised from n-butanol. The pure product of the formula

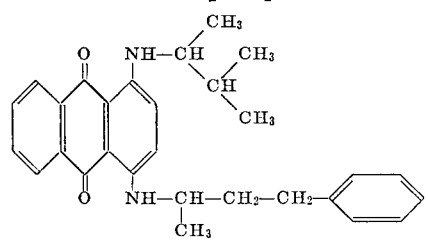

so obtained is sulphonated as described in Example 1. The dyestuff obtained dyes nylon and wool from a weakly acid bath in blue shades which have good fastness to washing.

If instead of the 4-(N-tosylamino)-anthraquinone compound of the first formula given above, equivalent amounts of the corresponding 4-(N-phenyl-sulphonylamino)-, 4-(N-methyl-sulphonylamino)-, 4-(N-acetylamino- or 4-(N-benzoylamino)-anthraquinone compound are used, then, with otherwise the same procedure, the same dyestuff is obtained.

Example 85

A mixture of 14.5 g. of the compound of the formula

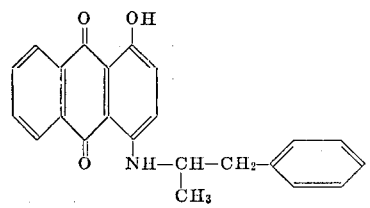

(obtained by reacting leuco-1,4-dihydroxy-anthraquinone with 1-phenyl-2-aminopropane), 20 g. of sec. butylamine, 40 g. of phenol and 9 g. of zinc dust is stirred for 18 hours in an autoclave at a temperature of 100°. The reaction mixture is put into a flask fitted with a stirrer, 300 ml. of ethanol and 50 ml. of 30% sodium hydroxide solution are added and the whole is stirred under reflux while simultaneously introducing a stream of air until no more leuco compound can be detected. The precipitate formed is filtered off, washed with methanol and then with water and then dried. By chromatography on an aluminium oxide column and recrystallisation the compound of the formula

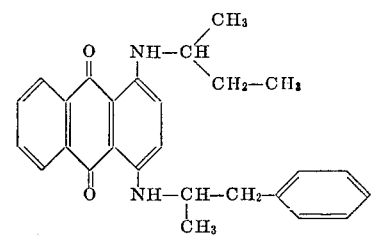

is obtained which, when sulphonated as described in Example 1, yields a dyestuff having good migratory power when dyed onto wool and nylon.

If with otherwise the same procedure, instead of the 1-hydroxyanthraquinone compound of the formula first given above, an equivalent amount of the corresponding 1-aminoanthraquinone compound is used, then the same dyestuff is obtained.

Example 86

A mixture of 37 g. of the compound of the formula

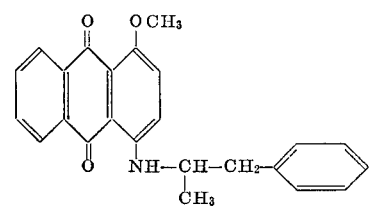

(obtained by methylation of the corresponding 1-hydroxyanthraquinone compound), 40 g. of sec. butylamine and 100 ml. of n-butanol is stirred in an autoclave for 24 hours at a temperature of 150°. 100 ml. of methanol are slowly poured into the mixture at a temperature of 60° whereupon the product formed percipitates. After cooling, the product is filtered off and recrystallised from n-butanol. The product is identical with that described in Example 85 and it is sulphonated as there described.

If, instead of the 1-methoxy-anthraquinone compound of the above formula, an equivalent amount of the corresponding 1-nitroanthraquinone compound is used (obtained by reacting 1-nitro-4-methoxy-anthraquinone with 1-phenyl-2-aminopropane) and otherwise the procedure described in Example 86 is followed, then the same dyestuff is obtained.

Example 87

A mixture of 16 g. of 1,4-dihydroxy-anthraquinone, 8 g. of leuco-1,4-dihydroxy-anthraquinone, 16 g. of 1-phenyl-3-amino-butane and 50 ml. of sec. butanol is stirred for 18 hours at a temperature of 50–55°. 25 g. of isopropylamine are added to the mixture without isolating the corresponding 1 - hydroxy - 4 - aralkyl-amino-anthraquinone obtained, and the whole is stirred in an autoclave for 20 hours at a temperature of 100°. The reaction mixture as well as 250 ml. of methanol are poured into a stirring flask and the mixture is stirred under reflux while simultaneously introducing air until no more leuco compound can be detected. After cooling, the precipitated product is filtered off and washed with methanol and then recrystallised from n-butanol. This product is identical with that of Example 1 and is sulphonated as there described.

If the mixture first given above of 1,4-dihydroxy-anthraquinone and leuco-1,4-dihydroxy-anthraquinone is reacted in a first step with the isopropylamine and in a second step with 1-phenyl-3-aminobutane, then the same end product is obtained with otherwise analogous procedure.

Example 88

10 g. of wool flannel are introduced at 40° into a dyebath containing 0.50 g. of sodium sulphate, 0.40 g. of 40% acetic acid and 0.20 g. of dyestuff according to Example 1 in 500 ml. of water, and the temperature is evenly raised to the boiling point within 30 minutes. The flannel is dyed for 1 hour at a light boil, then rinsed and finished in the usual way. A very level, brilliant blue dyeing is obtained which has good fastness to washing and light.

Example 89

10 g. of nylon 66 fabric are introduced into a 40° warm dyebath which contains 0.40 g. of 40% acetic acid, 0.25 g. of the sulphonate of ricinoleic acid butyl ester and 0.20 g. of the dyestuff obtained according to Example 1 in 500 ml. of water. The bath is brought evenly up to the boil within 30 minutes and dyeing is performed for 1 hour at a light boil. The fabric is then rinsed and dried. A level, brilliant blue dyeing is obtained which has good fastness to washing and light.

Example 90

10 g. of the dyestuff of the formula

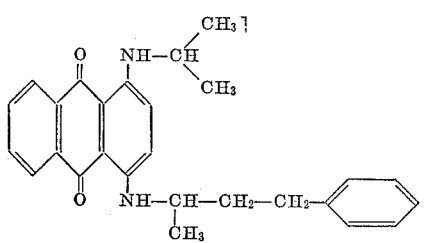

is dissolved in 1000 ml. of acetone and the solution is added with stirring to a solution of 2000 g. of 2.5-cellulose acetate in 14500 ml. of acetone. The resulting solution is poured onto a glass support to have a thickness, in the wet state, of about 1000 microns; after evaporation of the acetone solvent at room temperature, a film having a thickness of about 150 microns is obtained, which is clear, transparent and of brilliant blue shade having good light fastness.

Second aspect

A second aspect of the present invention concerns new fiber-reactive acid anthraquinone dyestuffs, processes for the production thereof, their use for the dyeing and printing of polyamide fibers as well as, as industrial product, the material dyed and printed therewith.

A great number of anthraquinone dyestuffs having very good fastness properties, particularly wet fastness properties, are known. But some of them are unsatisfactory in certain respects, for example, insufficient drawing power from a neutral bath, tendency to produce tippy dyeings, insufficient brilliancy or they cannot be combined well with other dyestuffs of this class.

Thus, while the blue anthraquinone dyestuffs according to the first aspect of the invention can be mixed with yellow dyestuffs of other classes which dye polyamide fibers, especially nylon or wool, from an acid exhaustion bath, in order to obtain various green shades, it is not possible to use these anthraquinone dyes for the dyeing of blended fiber materials containing the aforesaid polyamide fibers and another non-polyamide fiber component, if the latter component requires dyeing from a substantially neutral dyebath. They are also not suitable for the dyeing of the above mentioned polyamide fibers or the afore-mentioned blended fibers when they are to be used in mixture with yellow dyes of other dyestuff classes, for the purpose of obtaining green shades, if these yellow dyes do not permit use of an acid exhaustion bath but draw only from a substantially neutral medium.

These requirements are fully met by dyestuffs pertaining to the second aspect of the present invention. Moreover these new dyestuffs yield dyeings on the above-mentioned polyamide and blended fiber materials which are distinguished by specially outstanding wet fastness properties and brilliancy, especially including green shades obtained by mixture with neutral-drawing yellow dyes from other dyestuff classes.

Blended fiber materials contain besides the polyamide fibers, cellulosic fibers such as cotton, cellulose acetate including cellulose triacetate, polyethyleneglycol-terephthalate fiber or the like.

The new dyes according to this aspect of the invention are distinguished apart from fulfilling the requirements explained in the foregoing, by excellent level drawing property on the above-mentioned polyamide blended fibers, and by satisfactory to very good light fastness of the resulting dyeings on these fibers, even in green shades obtained by using the above-mentioned mixtures of the new dyes with suitable neutral-drawing yellow dyes.

Yellow dyes which draw from a neutral bath on the above-mentioned fibers and are particularly suitable for mixture with the neutral-drawing anthraquinone dyes according to the second aspect of the invention are those of the following classes: benzene-azo-pyrazolone dyes, benzene-azo-iminopyrazole dyes, pyrazolone-azo-arylene-azo-pyrazolone dyes or imino-pyrazole-azo-arylene-azo-iminopyrazole dyes.

A first class of these new dyestuffs falls under the formula

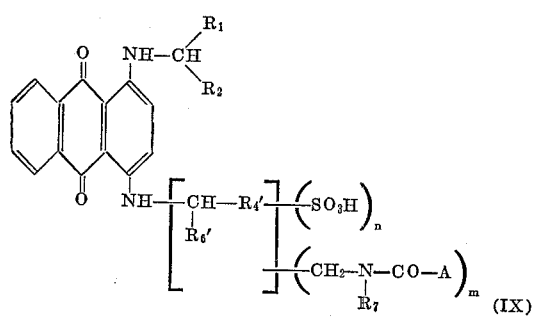

and a second class under the formula

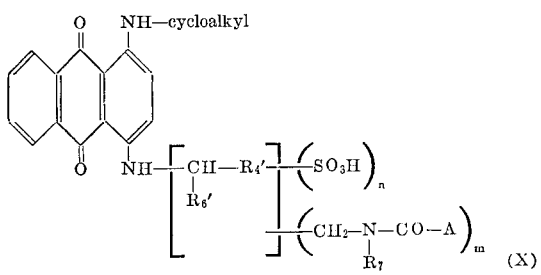

in which formulas $R_1$, $R_2$ and $R_4'$ have the same meanings as in the preceding formulas, each of $m$ and $n$ are numbers ranging from about 1 to 2, $R_6'$ is a divalent alkylene, cycloalkylene or aralkylene radical, the latter being linked by its alkyl moiety to the

group in said formulas and being unsubstituted or ring-substituted by lower alkyl and/or lower alkoxy groups and/or by halogen, $R_7$ represents hydrogen or lower alkyl, "cycloalkyl" means preferably the unsubstituted cyclopentyl or cyclohexyl group or a lower alkyl-substituted cyclopentyl or cyclohexyl group, and A represents an alkenyl group which can optionally contain at least one substituent which can be split off as ion, and which can be substituted, e.g., by lower alkyl and/or halogen, or it represents an alkyl group which contains at least one substituent which can be split off as ion and which can be substituted, e.g., by phenyl and/or halogen.

More in detail, in preferred subclasses of the dyestuffs falling under Formulas IX and X, $R_6'$ represents the same alkyl or cycloalkyl radical as represented by $R_6$ in Formula XIV, infra, or when $R_6$ represents aralkyl, the corresponding mono- or polyvalent aralkyl group, the radicals $R_4'$ and $R_6'$ together having a total of at least three and not more than five free bonds, and the number of aryl moieties in $R_4'$ and $R_6'$ counted together being preferably not more than two, and preferably one, $R_4'$ represents a mono- or polyvalent aralkyl radical preferably with one mononuclear carbocyclic, aryl moiety, which corresponds to the radical $R_4$ in Formula XIV, infra, and the groupings —SO$_3$H and

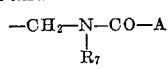

are each bonded to carbon atoms of the aryl nuclei in the aralkyl moieties $R_4'$ and/or $R_6'$.

The acid anthraquinone dyestuffs according to the invention are suitable for the dyeing and printing of synthetic polyamide fibers, primarily nylon, e.g. nylon 6 or nylon 66, or polyurethanes or, secondarily of natural polyamide such as silk, leather and, particularly, wool. They draw onto these fibers from a weakly acid to acid bath at higher temperature evenly and cover barriness of nylon very well. Compounds according to the invention of Formulas IX and X which contain two radicals —CH$_2$—N(R$_7$)—CO—A are advantageously dyed from a weakly acid bath in the presence of a dyeing auxiliary such as an addition product of about 5–20 mols of ethylene oxide to a fatty acid alkanolamide. Compounds of Formulas IX and X which contain only one radical —CH$_2$—N(R$_7$)—CO—A have particularly high drawing power from a neutral bath.

The blue dyeings obtained, particularly the wool dyeings, are distinguished by high brilliancy as well as by fastness to rubbing, good light fastness and good wet fastness properties, particularly fastness to washing, milling and sea water. In addition, the dyestuffs according to the invention are suitable for use in admixture with other acid dyestuffs to attain combination dyeings.

In some cases the new dyestuffs according to this aspect of the invention can be used for the dyeing of cellulose material, particularly cotton. Dyeing of this material is performed by the methods usual for reactive dyestuffs.

Particularly preferred among the dyestuffs of Formulas IX and X, on account of an optimal combination of the valuable dyeing properties outlined hereinbefore, are the dyestuffs of the formula

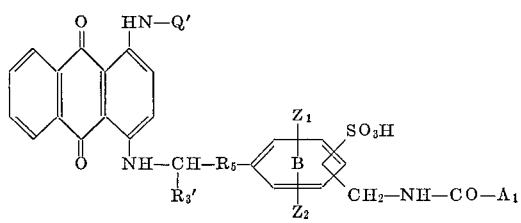

wherein

Q' represents one of the radicals

cyclopentyl or cyclohexyl, each of $R_1$ and $R_2$ represents lower alkyl, $R_3'$ represents alkyl of from 1 to 2 carbon atoms, $R_5$ represents alkylene of from 1 to 2 carbon atoms, $Z_1$ represents hydrogen, methyl, methoxy, chlorine or bromine, $Z_2$ represents hydrogen, methyl or methoxy, and $A_1$ represents —CCl=CH$_2$ or —CH$_2$Cl.

Another preferred subclass of dyestuffs according to the invention comprises the dyestuffs of the formula

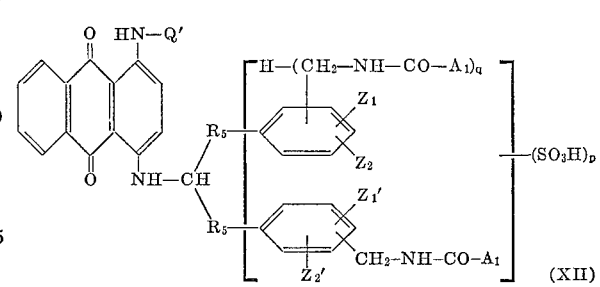

wherein $A_1$, Q' and $R_5$ have the same meanings as in Formula XI, each of $Z_1$ and $Z_1'$ represents hydrogen, methyl, methoxy, chlorine or bromine, each of $Z_2$ and $Z_2'$ represents hydrogen, methyl or methoxy, $p$ ranges from 1 to 2, and $q$ represents 0 or 1, not more than one —SO$_3$H group being linked to each of the two benzene nuclei.

The drawing power on nylon of the dyestuffs according to the invention, and particularly of those falling under Formulas XI and XII is particularly superior to that of the corresponding dyestuffs in which ring B is directly linked to the amino group in 4-position at the anthraquinone nucleus. The same applies to fastness of nylon dyeings obtained with the novel dyestuffs to rubbing and to milling.

Dyestuffs falling under Formulas XI and XII in which Q' represents the grouping

and particularly isopropyl, are particularly superior to the correspondingly substituted last-mentioned known dyestuffs in that their dyeings on synthetic polyamide fibers, and especially on texturized nylon (e.g. Banlon) show superior fastness to rubbing, and their dyeings on staple rayon are particularly superior in fastness to perspiration, especially alkaline perspiration.

Dyestuffs falling under Formula XI in which Q' represents a cycloalkyl radical and especially cyclohexyl are superior to the correspondingly substituted last-mentioned known dyestuffs in that their dyeings on the above-mentioned polyamide fibers, especially on texturized nylon are faster to rubbing and show a better coverage of barriness.

The unsulfonated dyestuffs according to the invention and particularly those corresponding to Formulas XI and XII but being free from sulfonic acid groups, are useful as disperse dyestuffs for the dyeing of polyamide fibers; the dyeings show good wet fastness properties.

Higher sulfonation, e.g., with one and a half, two or more sulfonic acid groups per mol of dyestuff according to Formula XII, leads to products of less satisfactory drawing power and unsatisfactorily low shade depth limit on polyamide fibers, especially on nylon. Wet fastness properties and coverage of barriness in nylon dyeings may also be adversely affected.

The dyestuffs according to this aspect of the invention, which fall under Formulas IX and X, are produced by reacting an anthraquinone compound of the formula

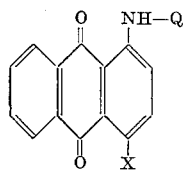

wherein
Q represents a secondary alkyl or a cycloalkyl group and X has the same meaning as in Formula I with an aralkylamine containing at least two replaceable hydrogen atoms in the nucleus of the formula

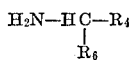

wherein
$R_4$ represents an aralkyl group optionally ring-substituted by lower alkyl or lower alkoxy groups or by halogen, and
$R_6$ represents an alkyl group, a cycloalkyl group or an aralkyl group optionally ring-substituted by lower alkyl and/or lower alkoxy groups and/or by halogen, to form the corresponding 1-sec. alkylamino- or 1-cycloalkyl-amino-4-aralkylamino-anthraquinone and, in any order desired, reacting the latter with $n$ mol of a sulfonating agent and with $m$ mol of a compound introducing the radical of the formula

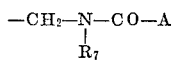

wherein
$R_7$ represents hydrogen or a lower alkyl group and A has the same meaning as in Formulas IX and X, to form an anthraquinone dyestuff of the average composition as defined in Formulas IX or X, respectively.

If Q is a secondary alkyl group then this advantageously contains at most 6 carbon atoms and is, e.g. the isopropyl, sec. butyl or sec. isoamyl group. When Q is a cycloalkyl group it is preferably a mononuclear group such as the cyclopentyl or cyclohexyl group or homologues thereof, or it is a polynuclear non-condensed cycloalkyl group such as a dodecahydrodiphenyl group or a polynuclear condensed group such as decahydronaphthyl-(1)- or-(2)- group.

Advantageously Q represents the isopropyl, sec. butyl or cyclohexyl group.

Aralkyl groups in the position of $R_4$ and $R_6$ are above all α-arylalkyl or β-arylalkyl groups, the aryl ring preferably being mononuclear. Examples thereof are the benzyl or phenethyl group. The aralkyl radicals in the positions of $R_4$ and $R_6$ can also contain two benzene nuclei. In this case they are, e.g. radicals of a β,β-diphenylethane. If the aryl rings of the aralkyl groups are substituted by low alkyl or alkoxy groups then these groups advantageously are, for instance, the methyl or ethyl group and the methoxy or ethoxy group, respectively; if they are substituted by halogen then this is for example fluorine, bromine or especially chlorine. The aliphatic part of the aralkyl radical can be straight or branched chained.

As alkyl group, $R_6$ is for example the methyl, ethyl or isobutyl group. When $R_6$ is a cycloalkyl group, it is preferably the cyclohexyl group.

In preferred aralkylamines of Formula XIV, $R_4$ is a phenylalkyl radical, especially the benzyl or phenethyl radical, and $R_6$ is a low alkyl group, preferably the methyl group.

X in Formula XIII represents, e.g. chlorine, bromine, the hydroxyl group, low alkoxy groups such as the methoxy group, or the nitro or amino group. However, X is preferably chlorine or bromine.

If $R_7$ is a low alkyl group then it is advantageously a methyl or ethyl group; more preferably, however, $R_7$ is hydrogen.

When A is an alkenyl group, it advantageously has 2 or 3 carbon atoms and not more than one double bond and is, e.g. a vinyl, propenyl, isopropenyl or allyl radical. If A is an alkyl group then it preferably contains 1 to 4 carbon atoms.

The substituents which can be split off as ion may be split off as anion or cation. Examples of the former are halogens such as chlorine or bromine, an alcoholic hydroxyl group esterified with sulphuric acid or with aliphatic or aromatic sulphonic acid, or the groups R—O—, R—S— and R—SO$_2$—, wherein R is an organic radical such as an aliphatic or aromatic hydrocarbon radical. Examples of groups which can be split off as cation are quaternary ammonium groups such as the trimethyl ammonium group, the group

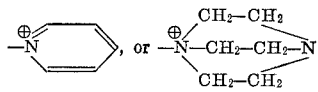

Preferably A contains a halogen atom in the α-position to the —CO— group and it is for example the chloromethyl, bromomethyl, α-chlorovinyl or α-bromovinyl group.

There can be one or more groups present in the radical A which can be split off as anion or cation.

When the alkyl groups are further substituted and the alkenyl groups are substituted or further substituted, they contain, e.g. a hydroxyl, carboxyl or aryl group, in the latter case preferably the phenyl group.

Examples of A are:

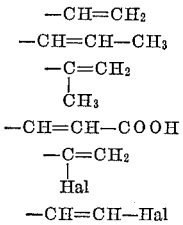

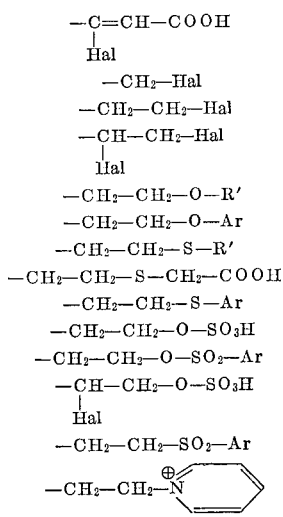

In the above, Hal represents chlorine or bromine, R' represents an alkyl group and Ar an aryl group.

In preferred compounds introducing the radical of Formula XV, A is the chloromethyl or the α-chlorovinyl group and $R_7$ is hydrogen.

Starting materials of Formula XIII are obtained by known processes, e.g. by chlorinating or brominating or nitrating the corresponding 1-sec. alkylamino- or 1-cycloalkylamino-anthraquinone compounds and, if desired, exchanging the chlorine or bromine for the hydroxyl or a low alkoxy group, or reducing the nitro group to the amino group. Starting compounds of Formula XIII wherein X is the hydroxyl group can also be obtained by reacting 1,4-dihydroxyanthraquinone or its leuco compound or a mixture thereof with the corresponding sec. alkylamine or cycloalkylamine. They can be used direct for reaction with the aralkylamine of Formula XIV without isolation.

The aralkylamines of Formula XIV are obtained, according to R. Leuckart, Ber. 18, 2341 (1885) for example, by reacting ketones of the formula

with ammonium formate or formamide and then splitting off the formyl group. In some cases, they can be obtained according to G. Mignonac C.r. 172, 223 (1921) by converting an arylidene ketone into the saturated amine with ammonia and hydrogen in the presence of a catalyst.

Examples of compounds which can be used to introduce the radical of Formula XV are the N-methylolamides or N-(chloromethyl)- or N-(bromoethyl)-amides of corresponding carboxylic acids of the formula

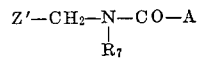

wherein Z' represents the hydroxyl group or chlorine or bromine.

The N-methylolamides are obtained, e.g. by adding formaldehyde to the corresponding carboxylic acid amides in the presence of basic condensing agents such as potassium carbonate, or also by reaction with mineral acid under mild conditions, and the N-(chloromethyl)- or N-(bromomethyl)-amides are obtained by reacting the methylolamides mentioned above with, e.g. thionyl chloride or thionyl bromide. Instead of the N-methylolamides or N-(halogenomethyl)-amides, also other reactive functional derivatives which react in the same way can be used, e.g. other esters of the methylol compounds with inorganic acids. Also the di-(carboxylic acid amidoethyl)-ethers obtained by condensation of the methylolamides in the presence of, e.g. phosphorus oxychloride, can be used. However, as these functional derivatives often have to be produced from the corresponding methylol compounds, the latter are preferred.

The reaction of the anthraquinone compound of Formula XIII with the aralkylamine of Formula XIV is performed, e.g. in solution or in the melt of an excess of aralkylamine as defined or in an organic solvent not taking part in the reaction. Preferable solvents for this purpose are, e.g. aromatic hydrocarbons such as toluene, xylenes or naphthalene; or halogenated or nitrated aromatic hydrocarbons such as chlorobenzene, di- and trichlorobenzene or nitrobenzene; or halogenated aliphatic hydrocarbons such as trichloroethylene; alcohols, e.g. alkanols such as n-butanol, sec. butanol or alkylene glycol monoalkyl ethers e.g. ethylene glycol monomethyl or monoethyl ether; aromatic hydroxyl compounds, e.g. phenol and its homologues; or tertiary nitrogen bases such as pyridine.

If, as starting material, an anthraquinone compound of Formula XIII is used wherein X is halogen, especially chlorine or bromine, the reaction is advantageously performed in the presence of copper or a copper compound such as cuprous chloride and in the presence of air acid buffering agent and, preferably at a raised temperature.

As acid buffering agent, advantageously an excess of the aralkylamine as defined is used, optionally together with an alkali metal salt of a fatty acid such as sodium or potassium acetate or of carbonic acid, such as sodium bicarbonate or sodium carbonate, or with an alkali metal hydroxide such as sodium or potassium hydroxide, or with magnesium oxide. In some cases, a tertiary amine such as triisopropanol-amine can be used as buffering agent.

The reaction of the 1-sec. alkylamino- or 1-cycloalkyl-amino-4-aralkylamino-anthraquinone compound with the compound introducing the radical of Formula XV is performed advantageously in the presence of acid condensing agents or agents splitting off water which react as such condensing agents. Examples of such condensing agents are concentrated hydrochloric acid, zinc chloride, phosphorous pentoxide, acetic acid anhydride, syrupy phosphoric acid and oleum. The preferred condensing agent, however, is 90% to anhydrous sulphuric acid. The reaction temperature can fluctuate within wide limits and depends mainly on the condensing agent used. In concentrated sulphuric acid, the reaction generally proceeds quickly and completely even at room temperature; in some cases a slightly raised temperature is necessary. The finished reaction products are precipitated, for instance, by pouring the sulphuric acid solutions or suspensions into ice water and they are converted into the water soluble alkali metal salts in the usual way and these are isolated.

In some cases, instead of the aforesaid N-methylolamides or N-halogenomethylamides a mixture of α,α'-dichloro- or α,α'-dibromo-dimethyl ether with the corresponding carboxylic acid amides or with carboxylic acid nitriles, usch as acrylonitrile or a halogen acrylonitrile can be used as compounds introducing the radical of Formula XV. In this case too, the reaction is advantageously performed in concentrated sulphuric acid. (This method of performing the process according to the invention is described, for example, in the following Belgian Patents: 630,205, 625,916, 628,442, 608,932, 613,037, 603,420, 612,417.)

The sulphonation is performed by usual methods, for instance, in concentrated sulphuric acid or in oleum under mild conditions, e.g. at room temperature, or with chlorosulphonic acid in a solvent which is inert under the reaction conditions.

In a preferred method, sulfonation is carried out with oleum having an $SO_3$-content of at least 3% but not more than about 10% by weight, preferably, however about 6 to 7%, at room temperature (15 to 35° C.). The degree of sulfonation attained is controlled by test-preferably of $R_4$, at least two exchangeable hydrogen atoms, of formula

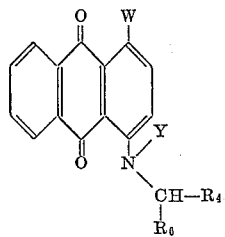

wherein

Y has the meaning given in Formula XVI,
W has that given in Formula XVII and
$R_4$ and $R_6$ have the meanings given in Formula XIV
with a (sec. alkyl)-amine or a cycloalkylamine of Formula XVIII to form the corresponding 1-sec. alkylamino- or 1-cycloalkyl-amino-4-(N-aralkyl-N-acylamino)-anthraquinone compound and, in any order desired, saponifying and reacting this with $n$ mol of a sulfonating agent and $m$ mol of a compound introducing the radical of Formula XV to form an anthraquinone dyestuff mixture of the average composition of Formula IX or X, respectively.

The starting materials of Formula XIX are obtained by known methods, e.g. by reacting an anthraquinone compound of Formula XVII with an acylating agent introducing the radical Y, preferably with acetyl chloride or bromide or with acetoanhydride.

The reaction of the acylamino-anthraquinone compound of Formula XIX with the (sec. alkyl)-amine or cycloalkylamine of Formula XVIII and the saponification of the 1-sec. alkylamino- or 1-cycloalkylamino-4-(N-aralkyl-N-acylamino)-anthraquinone compound as well as the sulfonation and reaction with the compound introducing the radical of Formula XV are performed as described in the first process of this aspect of the invention. The end products of Formulas IX and X are isolated preferably in the form of alkali metal salts, more preferably as sodium salts. They are very soluble in water.

The following non-limitative examples illustrate this aspect of the invention. The temperatures are given therein in degrees centigrade. Where not otherwise stated, parts and percentages are given by weight.

The dyestuffs according to the second and third aspect of the invention are mixtures of all the isomers falling under their respective formulas, with a few exceptions where such formula represents only individual compounds.

While it is possible to isolate the individual isomers constituting these mixed dyestuffs by known chromatographic techniques, and to identify the position of fiber-reactive or non-fiber-reactive Einhorn groups and sulfonic acid group or groups in all three aspects, in each isomer, from their magneto-nuclear resonance spectra, such further workup will not lead to products of improved properties, and is, moreover, highly uneconomical, so that it is of no practical value.

The following non-limitative examples illustrate this aspect of the invention. The temperatures are given therein in degrees centigrade. Where not otherwise stated, parts and percentages are given by weight.

Where in these examples reference is made to a preceding example it is one of those illustrating this second aspect of the invention.

Example 1

(I)(a)(1) A mixture of 19 g. of 1-cyclohexylamino-4-bromoanthraquinone, 19 g. of 1-phenyl-3-aminobutane, 5 g. of anhydrous potassium acetate, 0.005 g. of cuprous chloride, 10 ml. of n-butanol and 0.10 ml. of water is stirred for 48 hours at a temperature of 100°. 30 ml. of methanol are then added to the reaction mixture through a dropping funnel after which the temperature is kept for 30 minutes at 50° whereupon 50 ml. of isopropanol are also added to the reaction mixture. After cooling to room temperature, the precipitated product is filtered off and purified by recrystallization from n-butanol whereupon the compound of the formula

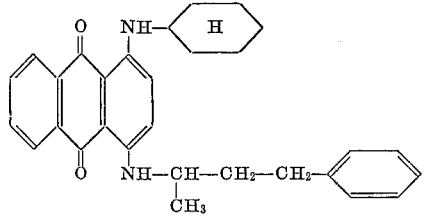

is obtained, M.P. 145°.

If instead of 1-cyclohexylamino-4-bromoanthraquinone, equivalent amounts of the 1-cycloalkylamino-4-halogenoanthraquinones given in the following Table 1 are used (produced by halogenating the corresponding 1-cycloalkylaminoanthraquinones with bromine in glacial acetic acid or with sulphuryl chloride in nitrobenzene), then with otherwise the same procedure, similar end products are obtained.

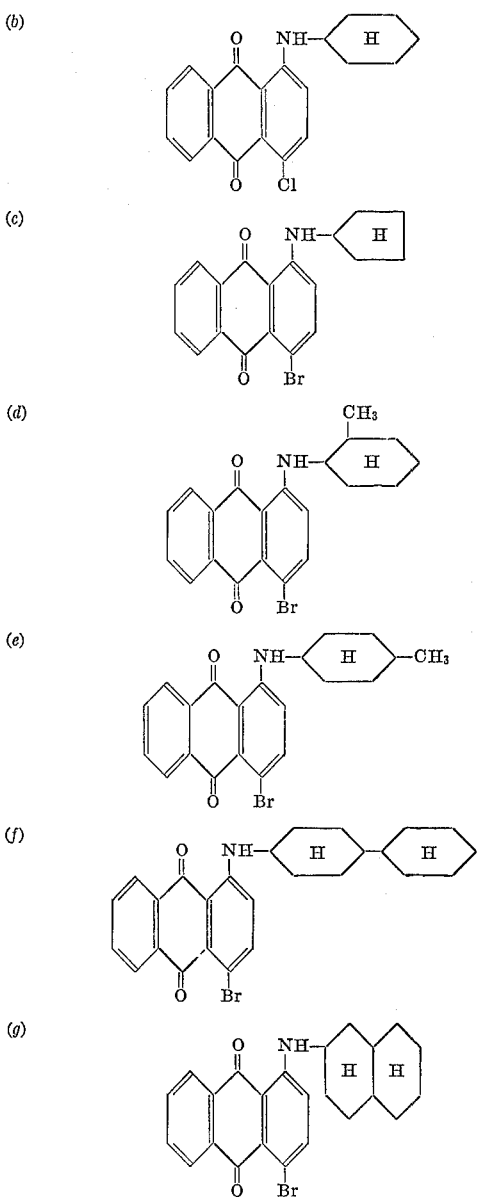

Other similar products are obtained if in the above Example 1, (a) instead of 1-phenyl-3-aminobutane, equivalent amounts of the aralkylamines given in the following ing the solubility of samples or other known methods which have been mentioned under the first aspect of the invention.

Isolation and identification of isomers constituting the dyestuffs of the invention could be achieved by the methods described under the first aspect of the invention, but they are of no practical value for the same reasons as stated thereunder.

A technically particularly simple and, therefore, preferred method consists in the condensation of the 1-sec. alkylamino- or 1-cycloalkylamino-4-aralkylamino-anthraquinone compound with the compound introducing the radical of Formula XV or precursors thereof and sulfonation of the condensation product obtained without isolation of the intermediate product. This condensation is performed in concentrated sulfuric acid whereupon the condensation product obtained is sulfonated in sulfuric acid solution.

The two operations last mentioned are advantageously so arranged that not more than one radical of Formula XIV and one sulfonic acid group are introduced per aralkyl radical having at least two replaceable hydrogen atoms in the nucleus.

A first modification of the process according to this aspect of the invention consists in reacting an anthraquinone compound of formula

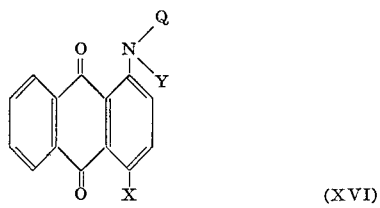

(XVI)

wherein

Y represents an acyl radical and
Q and X have the meanings given above, with an aralkylamine, having at least two replaceable hydrogen atoms in the nucleus, of Formula XIV to form the corresponding 1-(N-sec. alkyl-N-acylamino)- or 1 - (N - cycloalkyl-N-acylamino)-4-aralkylamino-anthraquinone compound and, in any order desired, saponifying this into the corresponding 1-sec. alkylamino- or 1-cycloalkylamino-4-aralkylamino-anthraquinone compound and reacting with $n$ mol of a sulfonating agent and $m$ mol of a compound introducing the radical of Formula XV to form an anthraquinone dyestuff mixture of the average composition of Formula IX or X, respectively.

Y represents, e.g. a carbacyl radical, particularly an alkanoyl radical, e.g. the formyl, acetyl or propionyl radical, or an aroyl radical such as the benzoyl radical, or an alkylsulfonyl radical such as the methylsulfonyl radical, or an arylsulfonyl radical such as the phenylsulfonyl or p-methylphenyl sulfonyl radical. Preferably Y is the acetyl radical.

The 1-acylamino-anthraquinones of Formula XVI are obtained by known methods, e.g. by reacting an anthraquinone compound of Formula XIII with an acylating agent introducing the radical Y, mainly with acetyl chloride or bromide or acetoanhydride.

The reaction of the 1-acylamino-anthraquinone compound of Formula XVI with the aralklamine of Formula XIV is performed as described in the first process. Preferably, the 1-(N-sec. alkyl-N-acylamino)- or 1-(N-cycloalkyl - N - acylamino)-4-aralkylamino-anthraquinone compound is first saponified, then reacted with the compound introducing the radical of Formula XV and finally sulfonated. Saponification is performed advantageously in aqueous acid medium, e.g. in aqueous sulfuric acid and, advantageously, at a raised temperature. The reaction with the compound introducing the radical of Formula XV and the sulfonation are performed as described in the first process of this aspect of the invention.

The quantitative reaction of an acylamino-anthraquinone compound of Formula XVI with an aralkylamine of Formula XIV and the subsequent quantitative saponification of the acyl radical are unexpected, as normally when arylamines are used instead of aralkylamines, insufficient yields are obtained on splitting off the acyl radical.

A second modification of the process according to this aspect of the invention consists in reacting an anthraquinone compound having in the aryl moiety of

preferably of $R_4$, at least two exchangeable hydrogen atoms, of formula

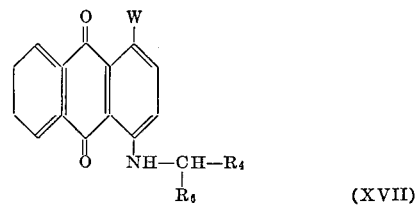

(XVII)

wherein W represents a substituent which can be exchanged for a (sec. alkyl)-amino or cycloalkylamino group and $R_4$ and $R_6$ have the meanings given in Formula XIV, with a (sec. alkyl)-amine or a cycloalkylamine of formula $$Q—NH_2 \quad (XVIII)$$

wherein Q has the meaning given in Formula XIII, to form the corresponding 1-sec. alkylamino- or 1-cycloalkylamino-4-aralkylamino-anthraquinone compound and, in any order desired, reacting this with $n$ mol of a sulphonating agent and $m$ mol of a compound introducing the radical of Formula XV to form an anthraquinone dyestuff mixture of the average composition of Formula IX or X, respectively.

W represents, like X in the first process, e.g. the hydroxyl or a low alkoxy group such as the methoxy group or the amino or nitro group, or especially chlorine or bromine.

The starting materials of Formula XVII are known or can be produced by known methods, e.g., by reacting a 1-chloro- or 1-bromo- or 1-nitro-4-low-alkoxy-anthraquinone with an aralkylamine of Formula XIV, and, if desired, converting the chlorine or bromine into a low alkoxy group or reducing the nitro group to the amino group.

Starting compounds wherein W is the hydroxyl group can be produced by reacting 1,4-dihydroxy-anthraquinone or its leuco compound or a mixture thereof with an aralkylamine of Formula XIV. They can be used direct without isolation for the condensation with the (sec. alkyl)-amine or cycloalkylamine of Formula XVIII.

The reaction of the compound of Formula XVII with the (sec. alkyl)-amine or cycloalkylamine of Formula XVIII to form the corresponding 1-sec. alkylamino- or 1-cycloalkylamino-4-aralkylamino-anthraquinone and the condensation of the latter with the compound introducing the radical of Formula XV and the sulphonation to form the end product of Formula IX or X are performed analogously to the descriptions given in the first process of this aspect of the invention.

A third modification of the process according to this aspect consists in reacting an anthraquinone compound, containing in the aryl moiety of

Table 2 are used and otherwise the procedure is the same as given in Example 1, (a).

TABLE 2

(2) C₆H₅–CH₂–CH(CH₃)–NH₂

(3) 2-Cl-C₆H₄–CH₂–CH(CH₃)–NH₂

(4) 4-Cl-C₆H₄–CH₂–CH(CH₃)–NH₂

(5) 2-CH₃-C₆H₄–CH₂–CH(CH₃)–NH₂

(6) 4-CH₃-C₆H₄–CH₂–CH(CH₃)–NH₂

(7) 2,4-(CH₃)₂-C₆H₃–CH₂–CH(CH₃)–NH₂

(8) 2-OCH₃-C₆H₄–CH₂–CH(CH₃)–NH₂

(9) C₆H₅–CH₂–CH(CH₂CH₃)–NH₂

(10) 2-Cl-C₆H₄–CH₂–CH(CH₂CH₃)–NH₂

(11) 2-Br-C₆H₄–CH₂–CH(CH₂CH₃)–NH₂

(12) 4-Cl-C₆H₄–CH₂–CH(CH₂CH₃)–NH₂

(13) 2-CH₃-C₆H₄–CH₂–CH₂–CH(CH₃)–NH₂

(14) 4-CH₃-C₆H₄–CH₂–CH₂–CH(CH₃)–NH₂

(15) 2,4-(CH₃)₂-C₆H₃–CH₂–CH₂–CH(CH₃)–NH₂

(16) 2-Cl-C₆H₄–CH₂–CH₂–CH(CH₃)–NH₂

(17) 4-Cl-C₆H₄–CH₂–CH₂–CH(CH₃)–NH₂

(18) 2-OCH₃-C₆H₄–CH₂–CH₂–CH(CH₃)–NH₂

(19) C₆H₅–CH₂–CH(CH₃)–CH(CH₃)–NH₂ (written as C₆H₅–CH₂–C(CH₃)H–NH₂ with CH₃ branches)

C₆H₅–CH₂–CH(CH₃)–NH–...

(19) C₆H₅–CH₂–CH(CH₃)–CH(CH₃)–NH₂

(20) 2-CH₃-C₆H₄–CH₂–CH(CH₃)–CH(CH₃)–NH₂

(21) 4-CH₃-C₆H₄–CH₂–CH(CH₃)–CH(CH₃)–NH₂

(22) 4-C₂H₅O-C₆H₄–CH₂–CH₂–CH(CH₃)–NH₂

(23) 2-Cl-C₆H₄–CH₂–CH(CH₃)–CH(CH₃)–NH₂

(24) 4-Cl-C₆H₄–CH₂–CH(CH₃)–CH(CH₃)–NH₂

(25) C₆H₅–CH₂–CH(CH₃)–CH(CH₂CH₃)–NH₂

(26) 2-Cl-C₆H₄–CH₂–CH(CH₃)–CH(CH₂CH₃)–NH₂

(27) C₆H₅–CH₂–CH₂–CH(CH₂CH₃)–NH₂

(28) C₆H₅–C(CH₃)₂–CH₂–CH(CH₃)–NH₂

(29) 4-CH₃-C₆H₄–C(CH₃)₂–CH₂–CH(CH₃)–NH₂

(30) 4-CH₃,2-CH₃-C₆H₃–C(CH₃)₂–CH₂–CH(CH₃)–NH₂

(31) C₆H₅–CH₂–CH₂–CH(CH₂CH(CH₃)₂)–NH₂

(32) 2-Cl-C₆H₄–CH₂–CH₂–CH(CH₂CH(CH₃)₂)–NH₂

(33) C₆H₅–CH₂–CH₂–CH(C₆H₁₁)–NH₂

TABLE 2—Continued

(34) ⬡—CH₂—CH₂—CH₂—CH₂—CH—NH₂
                              |
                              CH₂—CH(CH₃)₂

(35) ⬡—CH₂—CH₂—CH—NH₂
                  |
                  C₁₁H₂₃

(36) ⬡—CH₂—CH—CH₂—⬡
            |
            NH₂

(37) ⬡—CH₂—CH₂—CH—CH₂—CH₂—⬡
                  |
                  NH₂

(38) ⬡—CH₂—CH₂—CH—CH₂—CH₂—⬡-Cl
                  |
                  NH₂

(39) ⬡—CH₂—CH₂—CH—CH₂—CH₂—⬡—Cl
                  |
                  NH₂

(40) ⬡—CH—⬡
          |
          CH₂—CH—NH₂
              |
              CH₃

(41) ⬡—CH—⬡—Cl
          |
          CH₂—CH—NH₂
              |
              CH₃

(42) ⬡—CH₂—CH—CH₂—⬡—CH₃
              |
              NH₂

(43) CH₃—⬡—CH₂—CH₂—CH—CH₂—
                        |
                        NH₂
                        |
                        CH₂—⬡—CH₃

(44) CH₃—⬡—CH₂—CH₂—CH—CH₂—
                        |
                        NH₂
                        |
                        CH₂—⬡—Br

(45) ⬡—CH—⬡—Cl
          |
          CH₂—CH—NH₂
              |
              CH₃

(46) ⬡—CH—⬡—CH₃
          |
          CH₂—CH—NH₂
              |
              CH₃

(II) 45.2 g. of the compound of the formula

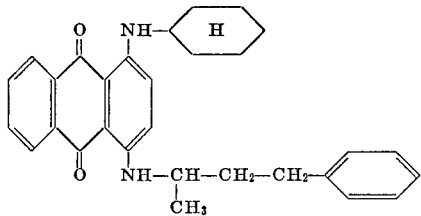

are added in portions to 13.7 g. of N-methylol chloracetamide until a homogeneous mixture is attained, the mixture is added to 500 g. of 90% sulphuric acid at a temperature of 5–10° and the solution obtained is stirred for 24 hours at this temperature. The mixture is then poured onto ice, the precipitated condensation product is filtered off, washed neutral with water and dried at 60° in vacuo. It is sulphonated by adding the product to 10 times its amount by weight, of 6% oleum at 23–25° and stirring the mixture for 18 hours. The solution is then poured onto ice, the precipitated dyestuff is filtered off and washed with aqueous 10% sodium chloride solution. The precipitate is slurried in water and the pH of the slurry is adjusted to 7 by the careful addition of dilute sodium hydroxide solution. The dyestuff is then precipitated by the addition of sodium chloride and is filtered off and dried at 60° in vacuo. The dyestuff is obtained as a blue powder which dissolves easily in water with a blue color.

The dyestuff dyes nylon and wool from a neutral to weakly acid bath in very brilliant blue shades. The dyeings are very level and have good fastness to light and excellent wet fastness.

If instead of the 1-cyclohexylamino-4-aralkylamino-anthraquinone compound of the above formula, an equivalent amount is used of one of the anthraquinone compounds given above, which is obtained (according to Example 1a) by reacting each of the 1-cycloalkylamino-4-halogeno-anthraquinones listed in Table 1 with 1-phenyl-3-amino-butane or each of the aralkylamines which are listed in Table 2, and otherwise the procedure given in Example 1 (II) is followed, then dyestuffs having similar good dyeing properties are obtained.

Dyestuffs having similar valuable properties are also obtained if, in each of the examples described above, instead of the 13.7 parts of N-methylol chloracetamide, an equivalent amount of the N-methylol compound of one of the amides given in the following Table 3 is used.

TABLE 3

(α) Br—CH₂—CONH₂

(β) Cl—CH₂—CO—NH
                |
                CH₃

(γ) Br—CH₂—CO—NH
                |
                C₂H₅

(δ) Cl—CH₂—CH—CONH₂
          |
          Cl (ε) Cl—CH₂—CH₂—CONH₂

(ζ) Br—CH₂—CH₂—CONH₂

(η) H₂C=C—CONH₂
        |
        Cl (θ) H₂C=C—CONH₂
        |
        Br (ι) Cl—CH=CH—CONH₂

(κ) H₂C=CH—CONH₂

(λ) H₂C=C—CONH₂
        |
        CH₃

(μ) Cl\
     C=C—CONH₂
    /   |
   Cl   Cl (ν) HO—CH₂—CONH₂   1)

(ξ) H₃C—C=CH—CONH₂
        |
        Cl (ο) H₃C—CH=C=CONH₂
              |
              Cl (π) HOOC—CH=C—CONH₂
              |
              Cl (ρ) HOOC—C=CH—CONH₂
          |
          Cl

1) See footnote at end of tables.

TABLE 3—Continued (σ) 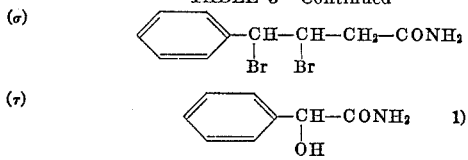

(τ) ![structure] PhCH(OH)—CONH₂  1)

1) In the sulphonation, the hydroxyl group is sulphated.

EXAMPLE 2

(I)(a)(1) A mixture consisting of 19.3 g. of 1-(N-acetyl - N-isopropyl-amino)-4-bromoanthraquinone and 16.2 g. of 1-phenyl-3-aminobutane is stirred for 20 hours at a temperature of 110°. The red melt obtained is then poured into a mixture of 200 g. of ice and 200 ml. of 2 N HCl whereupon the compound of the formula

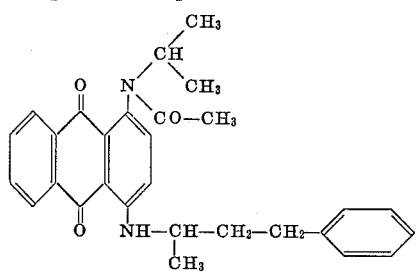

precipitates as a red resin. The aqueous hydrochloric acid phase is decanted and the product of the above formula is dissolved in 100 ml. of 80% sulphuric acid. This solution is stirred for 8 hours at a temperature of 50° and then poured onto ice whereupon the unsulfonated dyestuff of the formula

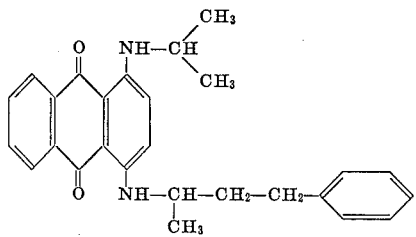

precipitates. It is separated by suction filtration and then purified by recrystallization from n-butanol.

If with otherwise the same procedure, there is used, instead of 1 - (N - acetyl-N-isopropylamino)-4-bromoanthraquinone, an equivalent amount of each of the 1-(N-acetyl - N - sec. alkylamino) - 4-halogeno-anthraquinones, respectively, given in the following Table 4 and 16.2 g. of 1-phenyl-3-aminobutane or an equivalent amount of each of the aralkylamines (2) to (46), respectively which aralkylamines are listed in the above Table 2, then similar valuable dyestuffs are obtained.

TABLE 4

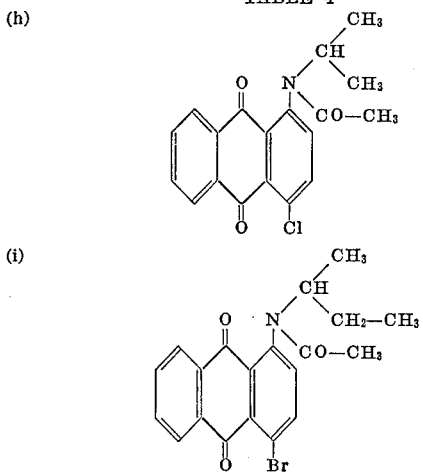

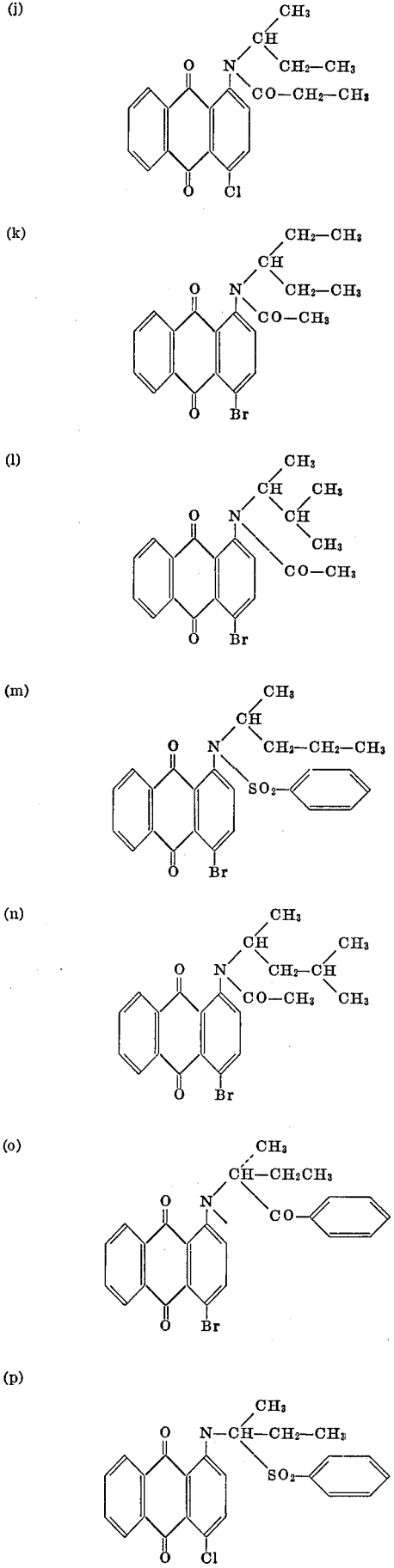

(q)

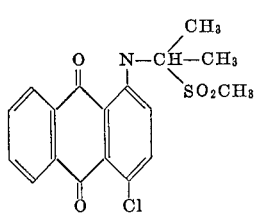

(II) A homogeneous mixture of 41.2 g. of the compound of the formula

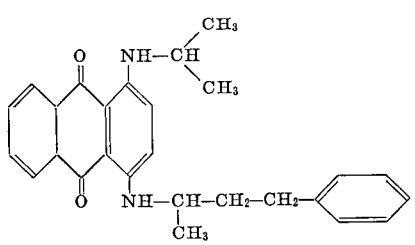

and 13.7 g. of N-methylol chloracetamide is added to 300 g. of 96% sulfuric acid at 0–5° and the solution obtained is stirred for 24 hours at this temperature. The temperature is then raised to 23° and 130 g. of 66% oleum are added gradually. The solution is stirred for another 6 hours at 23–25° and then poured onto ice. The product is worked up analogously to the procedure described in Example 1 (II).

A dyestuff is obtained which dyes nylon and wool from a neutral to weakly acid bath in very brilliant blue shades. The dyeings are very level, have good fastness to light and, at the same time, excellent wet fastness properties.

If with otherwise the same procedure, instead of the compound of the above formula, an equivalent amount of each of the compounds obtained by condensation of the 1-(N-acetyl-N-sec. alkylamino) - 4 - halogeno-anthraquinones listed in Table 4 with 1-phenyl-3-amino-butane or the aralkylamines listed in Table 2 is used, then dyestuffs having similar properties are obtained.

Dyestuffs with similar properties are also obtained if, with the procedure given above, the N-methylol compound of each of the amides ($\alpha$) to ($\tau$), respectively, given in Table 3 is used instead of N-methylol chloracetamide.

Example 3

13.7 g. of $\alpha$-chloracrylonitrile and 0.1 g. of hydroquinone are dissolved in 65 g. of 93% sulphuric acid at 20°, this solution is stirred for 3 hours at a temperature of 33–35°, cooled to 10–12°, 7.5 g. of $\alpha,\alpha'$-dichlorodimethyl ether are added dropwise within 1 hour and the mixture is stirred first for 3 hours at 10–12° and then for 4 hours at 13–15°.

350 g. of 90% sulphuric acid are then added to this solution after which 41 g. of the compound of the formula

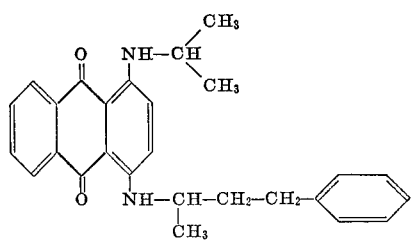

are added at a temperature of 5–10°. The mixture is stirred for 24 hours at this temperature, then poured onto ice and the condensation product is filtered off, washed neutral with water and then dried in vacuo at 60°. It is sulphonated in 6% oleum for 6 hours at 23–25° as described in Example 1. The dyestuff so obtained dyes nylon and wool from a weakly acid to neutral bath in level, brilliant blue shades; the dyeings have good light fastness and good wet fastness properties, especially good wash fastness.

If instead of the compound of the above formula, an equivalent amount of each of the compounds obtained, respectively, by reacting each of the 4-halogeno-anthraquinones (a) to (q) listed in Tables 1 and 4 with 1-phenyl-3-amino-butane or each of the phenylalkylamines (1) to (46), respectively, listed in Table 2 is used with otherwise the same procedure, then dyestuffs having similar valuable properties are obtained.

Dyestuffs having similar properties are also obtained if, with otherwise the same procedure, instead of $\alpha$-chloroacrylonitrile, an equivalent amount of each of the nitriles, respectively, given in the following Table 5 or the corresponding carboxylic acid amides are used.

TABLE 5

| | |
|---|---|
| (i) | $Cl-CH_2-CN$ |
| (ii) | $Br-CH_2-CN$ |
| (iii) | $Cl-CH_2-CH_2-CN$ |
| (iv) | $Cl-CH_2-CH(Cl)-CN$ |
| (v) | $Cl-CH=CH-CN$ |
| (vi) | $H_3C-C(Cl)=CH-CN$ |
| (vii) | $H_3C-CH=C(Cl)-CN$ |
| (viii) | $Cl_2C=C(Cl)-CN$ |
| (ix) | $H_3C-O-CH_2-CH_2-CN$ |
| (x) | $C_6H_5-O-CH_2-CH_2-CN$ |
| (xi) | $C_6H_5-S-CH_2-CH_2-CN$ |
| (ii) | $HOOC-CH_2-S-CH_2-CH_2-CN$ |
| (xiii) | $C_6H_5-SO_2-CH_2-CH_2-CN$ |
| (xiv) | $[C_5H_5N^{\oplus}-CH_2-CH_2-CN]Cl^{\ominus}$ |
| (xv) | $HO-CH_2-CH(Cl)-CN$ 1) |
| (xvi) | $HO-CH_2-CH_2-CN$ 1) |

1) In the sulphonation, the hydroxyl groups are sulphated.

Example 4

A mixture of 12 g. of 1-(N-sec. butylamino)-4-hydroxy-anthraquinone (obtained by reacting sec. butylamine with leuco-1,4-dihydroxy-anthraquinone), 18 g. of 1-phenyl-3-aminobutane, 40 g. of phenol and 9 g. of zinc dust is stirred for 18 hours at a temperature of 90°. 2 N hydrochloric acid is then added to the reaction mixture until the reaction is strongly acid and the phenol is removed by steam distillation. The precipitated reaction product is filtered off and washed first with 2 N hydrochloric acid and then with water and dried whereupon a blue powder is obtained. By chromatography on an alumina column followed by recrystallization from butanol, the pure product of the formula

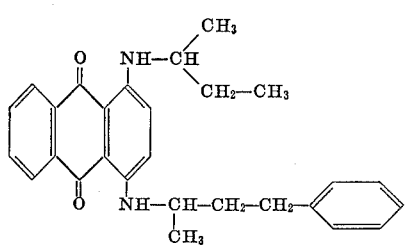

is obtained, M.P. 104°.

If instead of the 1-(N-sec. butylamino)-4-hydroxy-anthraquinone, the equivalent amount of 1-(N-sec. butylamino)-4-amino-anthraquinone [obtained frrom 1-(N-sec. butylamino)-4-nitro-anthraquinone by reduction] is used, then with otherwise the same procedure, the anthraquinone compound of the above formula is also obtained.

A homogeneous mixture of 42.6 g. of this anthaquinone compound and 13.7 g. of N-methylol chloracetamide is added to 450 g. of 90% sulphuric acid at a temperature of 5-10° and the solution obtained is stirred for 24 hours at this temperature whereupon the mixture is poured onto ice. Further work up of the product and sulfonation are performed as described in Example 1. The blue dyeings attained on wool and nylon with this dyestuff are very level and have good light and wet fastness properties.

Example 5

A mixture of 30 g. of 1-(N-isopropylamino)-4-methoxy-anthraquinone (obtained by methylation of 1-(N-isopropylamino)-4-hydroxy-anthraquinone) and 50 g. of 1-phenyl-2-methyl-3-amino-butane is stirred for 24 hours at a temperature of 150°. After cooling, the mixture is diluted with 250 ml. of methanol, the precipitated product is filtered off and washed with methanol and recrystallised from n-butanol. The compound of the formula

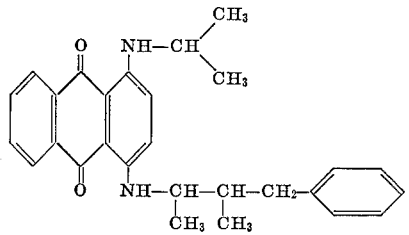

is obtained.

If with otherwise the same procedure, instead of 1-(N-isopropylamino)-4-methoxy-anthraquinone, an equivalent amount of 1-(N-isopropylamino)-4-nitro-anthraquinone (obtained by reaction of 1-methoxy-4-nitro-anthraquinone with isopropylamine) is used then the anthraquinone compound of the above formula is obtained.

42.6 g. of this anthraquinone compound of the above formula are added to 90% sulfuric acid and condensed therein at 5-10° with 13.7 g. of N-methylol chloracetamide by the procedure described in Example 1 (II) and the condensation product is sulfonated at 25° in 6% oleum for 18 hours. The dyestuff so obtained dyes nylon and wool from a weakly acid to neutral bath in brilliant blue shades. The dyeings have good wet and light fastness.

Example 6

(I) A mixture consisting of 39 g. of the compound of the formula

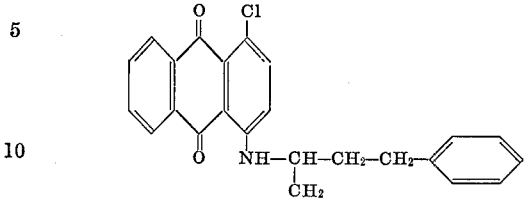

(obtained by reacting 1-chloro-4-methoxy-anthraquinone with 1-phenyl-3-aminobutane), 30 g. of 3-aminopentane, 10 g. of technical anhydrous potassium acetate, 0.010 g. of cuprous chloride, 0.30 ml. of water and 50 ml. of n-butanol is stirred in an autoclave for 48 hours at a temperature of 120°. After cooling, 200 ml. of methanol are slowly poured into the mixture while stirring whereupon the product formed precipitates. This is filtered off, washed with methanol, then with hot 2 N hydrochloric acid, and finally with water, and dried. On recrystallising from n-butanol, the compound of the formula

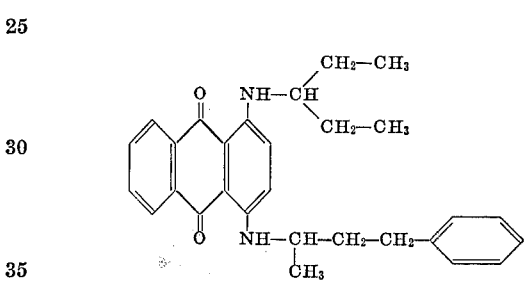

is obtained.

(II) 44 g. of this anthraquinone compound is condensed as described in Example 1 with 13.7 g. of N-methylol chloracetamide in 90% sulfuric acid and then sulfonated at 25° in 6% oleum for 18 hours. The blue dyeings obtained with this dyestuff on nylon and wool have good wet and light fastness.

If in step (I), instead of the 1-chloro-4-aralkylamino-anthraquinone compound there mentioned, an equivalent amount of the corresponding 1-bromo-anthraquinone is used, then, with otherwise the same procedure, the same end product is obtained.

Example 7

(I) A mixture of 54 g. of the compound of the formula

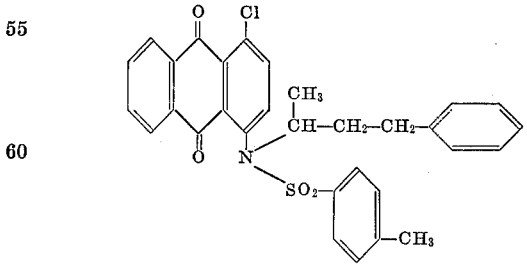

(obtained by reacting the corresponding 1-chloro-4-aralkylaminoanthraquinone compound with p-toluene sulphochloride), 30 g. of 2-amino-3-methylbutane and 100 ml. of n-butanol is stirred in an autoclave for 24 hours at a temperature of 110° whereupon the reaction mixture is steam-distilled. The residue, a red resin, is added to 600 g. of 80% sulphuric acid and the solution is stirred for 10 hours at a temperature of 60° whereby the tosyl radical is split off. The solution is poured onto ice, the precipitated product is filtered off and then recrystallised from n-butanol. The unsulfonated dyestuff obtained has the formula

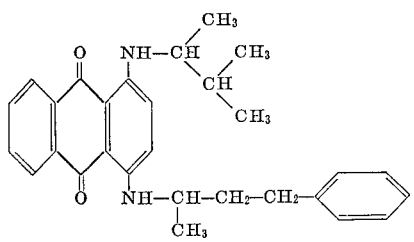

If, with otherwise the same procedure, instead of the above 1-chloro-4-(N-aralkyl-N-p-tolylsulfonylamino)-anthraquinone compound, an equivalent amount of each of the 1-halogeno-4-(N-acyl-N-aralkylamino)-anthraquinones, respectively, given in the following Table 6 with 30 g. of 2-amino-3-methylbutane is used, then the 1-sec. alkylamino-4-aralkylamino-anthraquinone of the above formula is also obtained.

TABLE 6

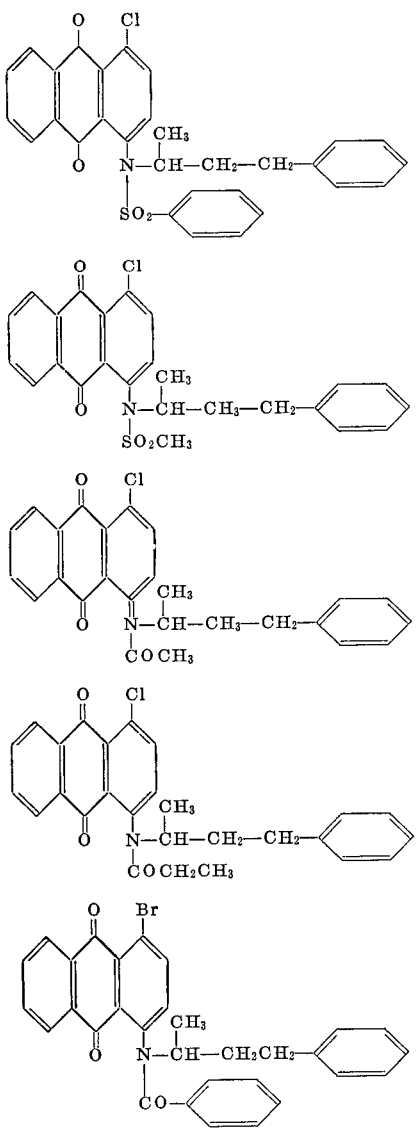

(II) 44 g. of the unsulfonated dyestuff of the above given formula obtained under (I) in this example are condensed as described in Example 1 (II) with 13.7 g. of N-methylol-chloracetamide and the condensation product is then sulfonated at 25° with 6% of oleum. The dyestuff thus obtained has valuable properties similar to those described in Example 1.

Example 8

A mixture of 14.5 g. of the compound of formula

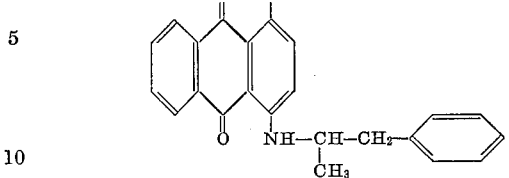

(obtained by reacting leuco-1,4-dihydroxy-anthraquinone with 1-phenyl-2-aminopropane), 20 g. of sec. butylamine, 40 g. of phenol and 9 g. of zinc dust is stirred for 18 hours in an autoclave at a temperature of 100°. The reaction mixture is transferred into a stirring flask, 300 ml. of ethanol and 50 ml. of 30% sodium hydroxide solution are added and the whole is stirred under reflux while simultaneously introducing a stream of air until no more leuco compounds can be detected. The precipitate obtained is filtered off, washed with methanol and then with water, and dried. By chromatography on an alumina column followed by recrystallization from butanol, the unsulfonated dyestuff of the formula

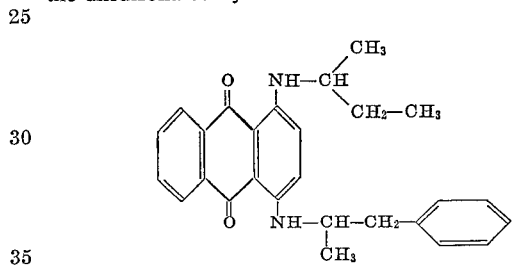

is obtained.

If, instead of the 1-hydroxy-anthraquinone compound of the first formula given above, an equivalent amount of the corresponding 1-amino-anthraquinone compound is used, then, with otherwise the same procedure, the anthraquinone compound of the above formula is also obtained.

41 g. of the unsulfonated dyestuff of the above formula are added to 90% sulfuric acid and condensed therein with 13.7 g. of N-methylol chloracetamide as described in Example 1 and then sulfonated in 6% of oleum at 25° for 15 hours. The monosulfonated dyestuff so obtained dyes nylon and wool from a weakly acid to neutral bath in brilliant blue shades. The dyeings have good wet and light fastness.

Example 9

A mixture of 37 g. of the compound of the formula

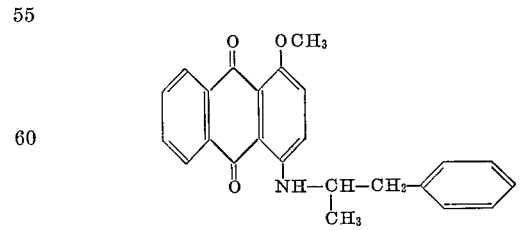

(obtained by methylating the corresponding 1-hydroxy-anthraquinone compound), 40 g. of sec. butylamine and 100 ml. of n-butanol is stirred for 24 hours in an autoclave at 150°. At a temperature of 60°, 100 ml. of methanol are slowly poured into the mixture whereupon a precipitate is formed. After cooling the reaction mixture, the precipitate is filtered off and recrystallized from n-butanol. The product is identical with the unsulfonated dyestuff described in Example 8 and is further reacted as there described.

49

If in the above Example 9, instead of the 1-methoxy-anthraquinone compound of the above formula, an equivalent amount of the corresponding 1-nitro-anthraquinone compound (obtained by reaction of 1-nitro-4-methoxy-anthraquinone with 1-phenyl-2-amino-propane is used and otherwise the procedure described in Example 9 is followed, then the same dyestuff is obtained.

Example 10

A mixture of 16 g. of 1,4-dihydroxy-anthraquinone, 8 g. of leuco-1,4-dihydroxy-anthraquinone, 16 g. of 1-phenyl-3-aminobutane and 50 ml. of sec. butanol is stirred for 18 hours at a temperature of 50 to 55°. Without isolating the corresponding 1-hydroxy-4-aralkylamino-anthraquinone so obtained, 25 g. of isopropylamine are added to the mixture and the whole is stirred in an autoclave for 20 hours at a temperature of 100°. The reaction mixture is transferred to a stirring flask, 250 ml. of methanol added thereto, and the mixture is stirred under reflux while simultaneously introducing a stream of air until no more leuco compound can be detected. After cooling, the precipitated reaction product is filtered off and washed with methanol after which it is recrystallized from n-butanol. This product is identical with the unsulfonated dyestuff of Example 2 and is further reacted as there described.

If the mixture first given above of 1,4-dihydroxy-anthraquinone and leuco-1,4-dihydroxy-anthraquinone is reacted in a first step with the isopropylamine and in a second step with 1-phenyl-3-aminobutane, then with otherwise analogous procedure, the same unsulfonated dyestuff is obtained.

Example 11

50 g. of the compound of the formula

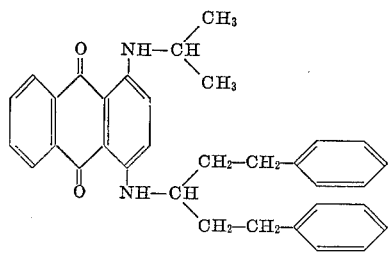

(obtained according to the process of Example 2 by condensation of 1-(N-acetyl-N-isopropylamino)-4-bromoanthraquinone with 1,5-diphenyl-3-aminopentane and then saponification of the acetyl group) are mixed with 27.5 g. of N-methylol chloracetamide, the mixture is added to 500 g. of 90% sulphuric acid at a temperature of 5–10° and the whole is stirred for 24 hours. The condensation product is isolated as described in Example 1 and sulphonated in 6% oleum at 25° for 16 hours.

Example 12

10 g. of wool flannel are introduced into a 40° warm dyebath consisting of 400 ml. of water, 0.30 g. of ammonium sulphate and 0.20 g. of the dyestuff of the formula

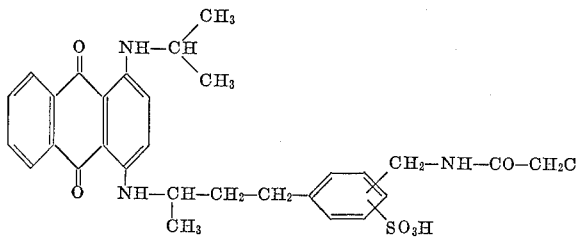

obtained according to Example 2. The temperature is gradually raised to the boil within 30 minutes whereupon dyeing is performed for 1 hour at the boil. The goods are then rinsed and finished in the usual way. A very level,

50 brilliant blue dyeing is obtained which is distinguished by excellent fastness to light and wet fastness properties.

Example 13

10 g. of wool flannel are introduced at 40° into a dyebath consisting of 400 ml. of water, 0.20 g. of the dyestuff of Example 11, 0.60 g. of acetic acid and 0.20 g. of a dyeing auxiliary based on a coconut fatty acid dialkanolamide polyglycol ether. The temperature is gradually raised to a light boil within 30 minutes whereupon dyeing is performed for 1 hour at the boil. The dyed goods are then rinsed and dried. A level, brilliant blue dyeing is obtained which has very good wet and light fastness.

Example 14

10 g. of nylon 66 fabric are introduced into a 40° warm dyebath which contains 0.20 g. of the dyestuff according to Example 12, 0.25 g. of the sodium salt of the acid sulfuric acid ester of butyl ricinoleate and 0.25 g. of ammonium sulfate in 500 ml. of water. The temperature of the bath is raised gradually to the boil within 30 minutes whereupon dyeing is performed for 1 hour at a light boil. The goods are then rinsed and dried. A very level, brilliant blue dyeing is obtained which has very good fastness to light and good fastness to washing.

Example 15

100 g. of a fabric of texturized nylon 66 (Banlon type) is introduced at 40° into a dyebath containing in 4000 ml. of water 3 g. of the dyestuff of the formula

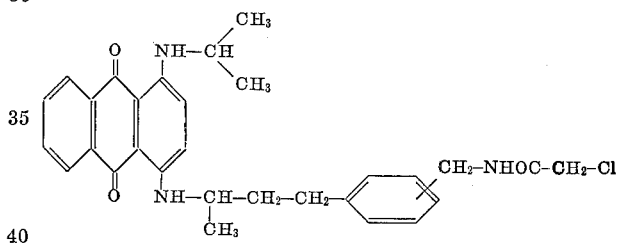

ground to an average particle size of about 2–5 microns, as well as 4 g. of oleic acid-N-methyl-tauride.

The temperature of the bath is raised evenly within about 30 minutes to the boil, and boiling is continued during another 60 minutes. The fabric is then thoroughly rinsed first in warm and then in cold water and dried. A brilliant blue dyeing of good fastness to water, to washing, to perspiration and to light is obtained.

A third aspect of the invention concerns new non-fiber reactive anthraquinone dyestuffs, processes for the production thereof, their use for the dyeing or printing of polyamide-containing fiber materials as well as such materials dyed or printed therewith.

Where in the subsequent description of this aspect of the invention, reference is made to preceding symbols, or numbers of formulas or examples, it is to the symbols, or numbers of formulas or examples occurring in the description of this aspect and not to those mentioned in the descriptions of preceding invention aspects, unless expressly stated otherwise.

Many of the known acid anthraquinone dyestuffs can only be used for the dyeing of synthetic polyamide fibers, e.g. nylon, to a limited degree because they may suffer from the following drawbacks:

Often, the drawing power of this type of dyestuffs is insufficient so that only dyeings of medium depth can be attained in an economic manner. The fastness to wet media of some of these dyestuffs does not meet the high degrees of fastness which are nowadays required; this is true particularly of fastness to perspiration, to water and to washing. A particularly serious drawback of many of the known dyestuffs is that they are unable to cover evenly fibers of different physical and chemical composition; this property which is referred to as "streaky dyeing" is particularly undesirable.

We have now found that a novel class of non-fiber-reactive, substantive acid anthraquinone dyestuffs free from these drawbacks is obtained by condensing an anthraquinone compound of Formula I

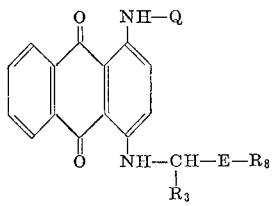

(I)

wherein

Q represents a secondary alkyl group or a cycloalkyl group, $R_3$ represents an alkyl group or a cycloalkyl group, $R_8$ represents an aryl radical having at least two replaceable hydrogen atoms and which may be substituted by lower alklyl or alkoxy groups or by halogen atoms and E represents an alkylene group, in any order desired with n mol of a sulphonating agent and one mol of a compound of Formula II

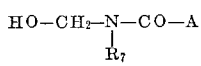

(II)

in which Formula II $R_7$ represents hydrogen or a lower alkyl group, and

A represents an unsubstituted alkyl radical, a cycloalkyl radical, an alkoxy radical, a cycloalkoxy radical or an aryl radical, or one mol or a reactive, functional derivative of such a methylol compound, to form an anthraquinone dyestuff or mixture of dyestuffs of Formula III

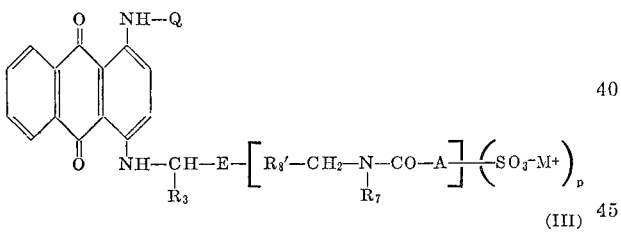

(III)

wherein p represents a number ranging from 1 to 2, $M^+$ represents a colorless cation, preferably an alkali metal ion, $R_8'$ represents an aryl group corresponding to the radical $R_8$ which is trivalent or tetravalent depending on p and Q, $R_3$, $R_7$, E and A have the meanings given hereinbefore. The $SO_3^-M^+$ groups present are bonded to aromatic ring carbon atoms.

As secondary alkyl group, Q advantageously has at most 6 carbon atoms and is, e.g. the isopropyl, sec. butyl or sec. isoamyl group. If Q is a cycloalkyl group then it is preferably a mononuclear group such as the cyclopentyl or cyclohexyl group or their alkyl-substituted, preferably lower alkyl-substituted homologs. However, it can also be a polynuclear, non-condensed cycloalkyl group such as a dodecahydro-diphenyl group, or a polynuclear condensed group such as a decahydro-naphthyl-(1) or -(2) group.

Preferably, Q is the isopropyl, sec. butyl or the cyclohexyl group.

If $R_3$ is an alkyl group then the chain thereof can be straight or branched; it contains, preferably, not more than 4 carbon atoms. Examples are the methyl, ethyl or isobutyl group. If $R_3$ is a cycloalkyl group then it is preferably the cyclohexyl group.

Aryl radicals symbolised by $R_8$ are preferably radicals of the benzene series. In aryl radicals $R_8$ substituted by lower alkyl or lower alkoxy groups, the latter advantageously contain 1 to at most 4 carbon atoms; in aryl radicals substituted by halogen atoms, the latter are fluorine, bromine or, preferably chlorine. All of the aforesaid substituents of aryl radicals $R_8$ are preferably in the o- or p-position to the alkylene bridge E. Preferably, especially in those dyestuffs in which $R_1$ has the last-mentioned preferred meaning, $R_8$ is an unsubstituted phenyl radical.

The chains of the alkylene groups E can also be straight or branched and, advantageously, contain 1 to 4 carbon atoms. Examples of such alkylene radicals are the methylene, 1,2-ethylene, 1,3 - propylene, 2,2 - propylene, 1,2-propylene, 2 - methyl - 1,2 - propylene, 1,4-butylene or 2,3-butylene radical.

In an especially preferred subclass of anthraquinone compounds falling under Formula III, Q represents the isopropyl, sec-butyl of cyclohexyl group, $R_3$ represents lower alkyl and especially the methyl group and E represents ethylene and $R_8'$ a trivalent or tetravalent benzene radical.

When $R_7$ is a lower alkyl group then this advantageously contains 1 to 4 carbon atoms. Preferably however, $R_7$ is hydrogen.

When A is an unsubstituted alkyl radical then this can be straight or branched and can have at most 12, but preferably not more than 6 carbon atoms. Cycloalkyl radicals in the position of A are, for example, those mentioned in the difinition of Q, but, particularly, the cyclohexyl radical. When A is an aryl radical, this is preferably a benzene radical which is unsubstituted or contains substituents, preferred ones being halogen atoms such as chlorine or bromine, or lower alkyl or lower alkoxy groups having preferably 1 to 4 carbon atoms, or the nitro group. When A is an alkoxy radical then it preferably contains 1 to 6 carbon atoms. As cycloalkoxy group, A represents especially the cyclohexyloxy group.

Acid anthraquinone dyestuffs of Formula III, especially those wherein Q, $R_3$ and $R_7$ have the above mentioned preferred meanings, and wherein A represents the radical of monochlorobenzene, a dichlorobenzene or a lower alkylbenzene, particularly however, the phenyl or p-tert.-butyl-phenyl radical, are of particular interest because of the particularly good fastness properties and freedom from streakiness of nylon materials dyed therewith.

The greater part of the starting materials of Formula I have been described in the first and second aspects of this invention; they are produced by known methods, e.g. by condensing an anthraquinone compound of Formula IV

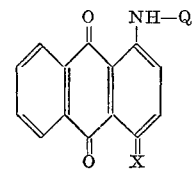

(IV)

wherein

Q has the meaning given in Formula I and

X represents halogen such as chlorine or bromine, the hydroxyl group, a lower alkoxy group such as the methoxy group, the nitro or amino group, with an aralkylamine of Formula V

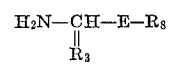

(V)

wherein $R_3$, $R_8$ and E have the meanings given in Formula I.

Such starting materials can also be produced by condensing an anthraquinone compound of Formula VI

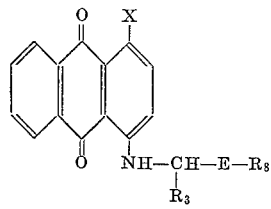

(VI)

wherein
$R_3$, $R_8$ and E have the meanings given in Formula I and X has that given in Formula IV, with a secondary alkylamine or a cycloalkylamine of Formula VII $$Q-NH_2 \quad (VII)$$

wherein Q has the meaning given in Formula I.

The N-methylol amides of Formula II are obtained e.g. by adding formaldehyde to the carbamides of the Formula VIII

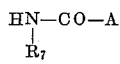

(VIII)

wherein A and $R_7$ have the meaning given for Formula II, in the presence of basic condensing agents such as potassium carbonate. Reactive functional derivatives of the compounds of Formula II are especially the reactive esters of these compounds with strong acids such as the N-(chloromethyl)- or N-(bromomethyl)-amides. These esters are obtained, e.g. by reaction of thionyl chloride or thionyl bromide with the methylol amides mentioned. Other suitable reactive derivatives of the methylol amides of Formula II are, e.g. the di-(carboxylic acid amidomethyl)-ethers obtained from these methylol compounds in the presence of, e.g. phosphorus oxychloride. As these reactive derivatives have to be produced from the methylol compounds of Formula II, the latter are to be preferred.

Instead of compounds of Formula II or their reactive functional derivatives, a reaction product of α,α'-dihalogeno-dimethyl ether such as α,α'-dichloro- or α,α'-dibromo- dimethyl ether can be used, in sulphuric acid, with the amides of the formula

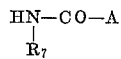

or with the nitriles of the formula N≡C—A (which are saponified under the reaction conditions to the amides mentioned) such as acetonitrile, propionitrile or benzoic acid nitrile. Advantageously concentrated (90–100%) sulphuric acid is used in these cases.

The 1,4-diamino-anthraquinone compounds of Formula I are advantageously first condensed with a compound of Formula II and then sulphonated. Sulphonation is performed by usual methods, e.g. in concentrated sulphuric acid or in oleum, preferably under mild temperature conditions, e.g. at room temperature, or with chlorosulphonic acid in an organic solvent not taking part in the reaction, e.g. in chlorobenzene or nitrobenzene.

The reaction of unsulphonated or sulphonated compounds of Formula I with the compound of Formula II is advantageously performed in acid medium, e.g. in the presence of acid condensing agents or of agents which split off water which react in the same way. Examples of such condensing agents are concentrated hydrochloric acid, zinc chloride, phosphorus pentoxide, acetic acid anhydride, syrupy phosphoric acid and oleum. The preferred condensing agent, however, is 90% to anhydrous sulphuric acid. The condensation temperature can vary between wide limits and depends chiefly, on the condensing agent used. In concentrated sulphuric acid the reaction proceeds quickly and completely even at 0° C., preferably however, at room temperature (20–25° C.); in some cases a slightly raised temperature, e.g. up to 60° C., is necessary. The finished reaction products are separated, e.g. by pouring the sulphuric acid solutions or suspensions into ice water and they are converted in the usual way into the water soluble alkali metal salts whereupon the latter are isolated.

A technically particularly simple and, therefore, preferred method of performing the reaction consists in the condensation of the 1-sec. alkylamino- or 1-cycloalkylamino-4-aralkylamino anthraquinone compounds of Formula I with a compound of Formula II and sulphonation of the condensation product obtained without isolation of the intermediate product. In this case the condensation is performed in concentrated (90–100%) sulphuric acid, whereupon the condensation product obtained is sulphonated in the same sulphuric acid solution, the $SO_3$— content of which is adjusted to at the most 20%, preferably to 6–10% by the addition of oleum.

Dyestuffs of Formula III which contain a single sulphonic acid group are preferred.

A modification of the process according to the invention consists in saponifying the acylamino group of an anthraquinone compound of Formula IX

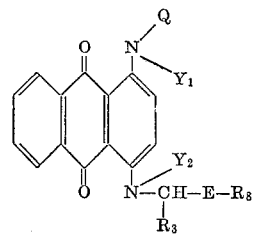

(IX)

wherein of
$Y_1$ and $Y_2$, one represents hydrogen and the other represents an acyl radical, and
$R_3$, $R_8$, E and Q have the meanings given in Formula I, sulphonating with $n$ mol of a sulphonating agent and reacting with one mol of a compound introducing the radial of Formula II, or one mol of reactive functional derivatives of this methylol compound, the saponification, sulphonation and reaction being performed in any order desired. In this way anthraquinone dye-stuffs of Formula III are obtained.

Examples of acyl radicals symbolished by $Y_1$ or $Y_2$ are carbacyl radicals, particularly alkanoyl radicals, e.g. formyl, acetyl or propionyl radicals, or aroyl radicals such as benzoyl radicals, or alkylsulphonyl radicals such as methylsulphonyl radicals, or arylsulphonyl radicals such as phenylsulphonyl or p-methylphenyl sulphonyl radicals. If $Y_1$ or $Y_2$ represents an acyl radical then this is preferably the acetyl radical.

Acylamino anthraquinones of Formula IX can be produced by methods known per se. When $Y_1$ is an acyl radical and $Y_2$ is hydrogen, the acylamino anthraquinones of Formula IX are obtained, for example, by reacting an anthraquinone compound of Formula IV with an acylating agent, especially acetyl chloride or bromide or acet anhydride, and then condensing the N-acyl-N-sec. alkylamino- or N-acyl-N-cycloalkylamino- anthraquinone compound obtained with an aralkylamide of Formula V.

Acylamino anthraquinones of Formula IX wherein the acyl radical is in the position of $Y_2$ are obtained, e.g., by reacting an anthraquinone compound of Formula VI first with an acylating agent, e.g. one of these mentioned above, and then with a sec. alkylamine or cycloalkylamine of Formula VII.

Acylamino anthraquinone compounds of Formula IX are preferably first saponified at the acylamino group, then reacted with a compound of Formula II and finally sulphonated.

The saponification is advantageously performed in aqueous acid medium, e.g. in aqueous sulphuric acid (50 to 90%) and, preferably, at a raised temperature (e.g. 50 to 100° C.). In contrast to previously known anthraquinone compounds of similar structure which contain an arylamino group instead of an aralkylamino group, the saponification produces very good yields. The reaction with the compound of Formula II and the sulphonation are performed as described in the first process above.

The end products of Formula III are preferably isolated in the form of alkali metal salts, more especially as sodium salts. They have very good water solubility.

The acid anthraquinone dyestuffs according to the invention are particularly suitable for the dyeing and printing of fibre material containing synthetic polyamide such as nylon or polyurethanes; they can also be used, however, for the dyeing of natural polyamide fibres such as silk and wool.

Dyed onto nylon from a weakly acid bath they have very good drawing power and produce level, non-stripy and very brilliant blue dyeings. They are also suitable for dyeing by the high temperature process; under these dyeing conditions they have good migratory power.

The dyeings on nylon are distinguished by good fastness to light and good wet fastness properties such as fastness to water, washing and perspiration. Also, in admixture with other acid dyestuffs, the dyestuffs according to the invention are suitable for the acquisition of combination dyeings.

The term "lower" as used in this specification including the claims in connection with "alkyl" and "alkoxy" and the like aliphatic groups means that these radicals have not more than 4 carbon atoms, unless expressly stated otherwise.

The following non-limitative examples illustrate the invention. The temperatures are given therein in degrees centigrade and percentages are by weight.

EXAMPLE 1

45.2 g. of the compound of the formula

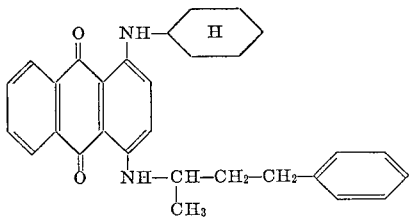

are homogeneously mixed with 16.6 g. of N-methylol benzamide, the mixture is added in portions to 500 g. of 90% sulphuric acid at a temperature of 5–10° and the solution obtained is stirred for 24 hours at this temperature. The mixture is then poured onto ice, the precipitate formed of the condensation product is filtered off, washed neutral with water and dried at 60° in vacuo. The product is sulphonated by adding it at 23–25° to 10 times the amount by weight of 6% oleum and stirring the mixture for 6 hours. The solution is then poured onto ice, the precipitated dyestuff is filtered off and washed with 10% sodium chloride solution. The residue is slurried in a little water and the pH of the mixture is adjusted to 7 by the careful addition of dilute sodium hydroxide solution. The dyestuff is then precipitated by the addition of sodium chloride, filtered off and dried in vacuo at 60°. The dyestuff of the formula

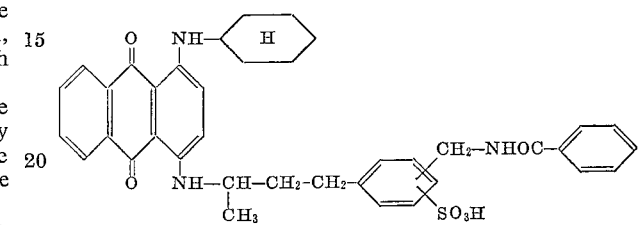

is obtained as a blue powder which easily dissolves in water with a blue colour.

The dyestuff dyes nylon from a weakly acid bath in very brilliant blue shades. The dyeings are very level, have good fastness to light and excellent wet fastness properties, particularly good water, washing and perspiration fastness.

The 1-cyclohexylamino-4-(4'-phenylbutyl-(2')-amino)-anthraquinone used as starting material is obtained as follows:

A mixture of 19 g. of 1-cyclohexylamino-4-bromo-anthraquinone, 19 g. of 1-phenyl-3-aminobutane, 5 g. of anhydrous potassium acetate, 0.005 g. of cuprous chloride, 10 ml. of n-butanol and 0.10 ml. of water is stirred for 48 hours at a temperature of 100°. 30 ml. of methanol are then added through a dropping funnel to the reaction mixture and then the temperature is kept at 50° for 30 minutes, after which 50 ml. of isopropanol are added to the mixture. After cooling to room temperature, the precipitated product is filtered off and purified by recrystallisation from n-butanol whereupon the compound of the formula first given above is obtained, M.P. 145°.

Other anthraquinone dyestuffs having similar properties and which also dye synthetic polyamide fibres in fast blue shades are given in the following Table I. They are obtained by reacting the 1-cycloalkyl-amino-4-aralkyl-amino-anthraquinone compounds given in column II with the N-methylol compounds given in column III by the method described in Example 1 and then sulphonating in the same way as described in Example 1.

TABLE I

| No. | R | R' | N-methylol compounds |
|---|---|---|---|
| 2 | ⟨H⟩—NH— | ⟨⟩—CH₂CH₂CH(CH₃)—NH— | Cl-⟨⟩—CONH—CH₂OH |
| 3 | Same as above | Same as above | Cl—⟨⟩—CONH—CH₂OH |

TABLE I—Continued

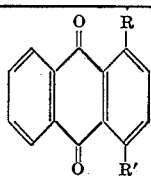

| No. | R | R' | N-methylol compounds |
|---|---|---|---|
| 4 | do | do | 2,4-Cl₂-C₆H₃-CONH-CH₂OH |
| 5 | do | do | 4-O₂N-C₆H₄-CONH-CH₂OH |
| 6 | do | do | 2-NO₂-C₆H₄-CONH-CH₂OH |
| 7 | do | do | 3-NO₂-C₆H₄-CONH-CH₂OH |
| 8 | do | do | 4-CH₃-3-NO₂-C₆H₃-CONH-CH₂OH |
| 9 | do | do | 2,4-(CH₃)₂-C₆H₃-CONH-CH₂OH |
| 10 | do | do | 3,4-(CH₃)₂-C₆H₃-CONH-CH₂OH |
| 11 | do | do | C₆H₅-CONH-CH₂OH |
| 12 | do | do | C₃H₇CH₂-CONH-CH₂OH |
| 13 | do | do | CH₃CH₂CH₂-CONH-CH₂OH |
| 14 | do | do | CH₃CH₂CH₂CH₂CONH-CH₂OH |
| 15 | do | do | CH₃CH₂CH₂CH₂CH₂-CONH-CH₂OH |
| 16 | do | do | CH₃CH₂-O-CONH-CH₂OH |
| 17 | do | do | C₆H₅-O-CONH-CH₂OH |
| 18 | do | do | CH₃CH₂CH₂-O-CONH-CH₂OH |
| 19 | do | do | (CH₃)₂CH-O-CONH-CH₂OH |
| 20 | do | do | CH₃CH₂CH₂CH₂-O-CONH-CH₂OH |
| 21 | do | do | CH₃CH₂CH(CH₃)-O-CONH-CH₂OH |
| 22 | do | do | (CH₃)₃C-CH₂-O-CONH-CH₂OH |
| 23 | do | do | (CH₃)₂CHCH₂CH(CH₃)-O-CONH-CH₂OH |

TABLE I—Continued

Structure: anthraquinone with R at 1-position and R' at 4-position

| No. | R | R' | N-methylol compounds |
|---|---|---|---|
| 24 | do | do | 2-methylcyclohexyl-O-CONH-CH₂OH (cyclohexyl with CH₃ and H substituents, O-CONH-CH₂OH) |
| 25 | do | do | (CH₃)₃C-C₆H₄-CONH-CH₂OH |
| 26 | do | do | Br-C₆H₄-CONH-CH₂OH |
| 27 | do | do | CH₃-CO-N(CH₃)-CH₂OH |
| 28 | do | C₆H₅-CH₂-CH(CH₃)-NH- | C₆H₅-CO-NH-CH₂OH |
| 29 | do | (2-Cl-C₆H₄)-CH₂-CH(CH₃)-NH- | Same as above |
| 30 | do | (4-Cl-C₆H₄)-CH₂-CH(CH₃)-NH- | Do. |
| 31 | do | (2-CH₃-C₆H₄)-CH₂-CH(CH₃)-NH- | Do. |
| 32 | do | (4-CH₃-C₆H₄)-CH₂-CH(CH₃)-NH- | Do. |
| 33 | do | (3,4-di-CH₃-C₆H₃)-CH₂-CH(CH₃)-NH- | Do. |
| 34 | do | (2-OCH₃-C₆H₄)-CH₂-CH(CH₃)-NH- | Do. |
| 35 | do | C₆H₅-CH₂-CH(CH₂CH₃)-NH- | Do. |
| 36 | do | (2-Cl-C₆H₄)-CH₂-CH(CH₂CH₃)-NH- | Do. |
| 37 | do | (2-Br-C₆H₄)-CH₂-CH(CH₂CH₃)-NH- | Do. |
| 38 | do | (4-Cl-C₆H₄)-CH₂-CH(CH₂CH₃)-NH- | Do. |
| 39 | do | (2-CH₃-C₆H₄)-CH₂CH₂-CH(CH₃)-NH- | Do. |

TABLE I—Continued

Structure: anthraquinone with R at 1-position and R' at 4-position

| No. | R | R' | N-methylol compounds |
|---|---|---|---|
| 40 | do | CH$_3$—C$_6$H$_4$—CH$_2$CH$_2$—CH(CH$_3$)—NH— | Do. |
| 41 | do | CH$_3$—C$_6$H$_3$(CH$_3$)—CH$_2$CH$_2$—CH(CH$_3$)—NH— | Do. |
| 42 | do | (2-Cl-C$_6$H$_4$)—CH$_2$CH$_2$—CH(CH$_3$)—NH— | Do. |
| 43 | do | Cl—C$_6$H$_4$—CH$_2$CH$_2$—CH(CH$_3$)—NH— | Do. |
| 44 | do | (2-OCH$_3$-C$_6$H$_4$)—CH$_2$CH$_2$—CH(CH$_3$)—NH— | Do. |
| 45 | do | C$_6$H$_5$—CH$_2$—CH(CH$_3$)—CH(CH$_3$)—NH— | Do. |
| 46 | do | (2-CH$_3$-C$_6$H$_4$)—CH$_2$—CH(CH$_3$)—CH(CH$_3$)—NH— | Do. |
| 47 | do | CH$_3$—C$_6$H$_4$—CH$_2$—CH(CH$_3$)—CH(CH$_3$)—NH— | Do. |
| 48 | do | C$_2$H$_5$O—C$_6$H$_4$—CH$_2$CH$_2$—CH(CH$_3$)—NH— | Do. |
| 49 | do | (2-Cl-C$_6$H$_4$)—CH$_2$—CH(CH$_3$)—CH(CH$_3$)—NH— | Do. |
| 50 | do | Cl—C$_6$H$_4$—CH$_2$—CH(CH$_3$)—CH(CH$_3$)—NH— | Do. |
| 51 | do | C$_6$H$_5$—CH$_2$—CH(CH$_3$)—CH(CH$_2$CH$_3$)—NH— | Do. |
| 52 | do | (2-Cl-C$_6$H$_4$)—CH$_2$—CH(CH$_3$)—CH(CH$_2$CH$_3$)—NH— | Do. |
| 53 | do | C$_6$H$_5$—CH$_2$CH$_2$—CH(CH$_2$CH$_3$)—NH— | Do. |
| 54 | do | C$_6$H$_5$—C(CH$_3$)(CH$_3$)—CH$_2$—CH(CH$_3$)—NH— | Do. |
| 55 | do | CH$_3$—C$_6$H$_4$—C(CH$_3$)(CH$_3$)—CH$_2$—CH(CH$_3$)—NH— | Do. |

TABLE I—Continued

Structure: anthraquinone with R at 1-position and R' at 4-position

| No. | R | R' | N-methylol compounds |
|---|---|---|---|
| 56 | do | CH₃-C₆H₃(CH₃)-C(CH₃)₂-CH₂-CH(CH₃)-NH— | Do. |
| 57 | do | C₆H₅-CH₂-CH₂-CH(CH₂CH(CH₃)₂)-NH— | Do. |
| 58 | do | (2-Cl-C₆H₄)-CH₂CH₂-CH(CH₂CH(CH₃)₂)-NH— | Do. |
| 59 | do | C₆H₅-CH₂CH₂-CH(C₆H₁₁)-NH— | Do. |
| 60 | do | C₆H₅-CH₂CH₂CH₂CH₂-CH(CH₂CH(CH₃)₂)-NH— | Do. |
| 61 | do | C₆H₅-CH₂CH₂-CH(C₁₁H₂₃)-NH— | Do. |
| 62 | C₆H₁₁-NH— | C₆H₅-CH₂-CH(CH₃)-CH(CH₃)-NH— | Do. |
| 63 | (2-CH₃-C₆H₁₀)-NH— | C₆H₅-CH₂CH₂-CH(CH₃)-NH— | Do. |
| 64 | CH₃-C₆H₁₀-NH— | Same as above | Do. |
| 65 | (C₆H₁₁-C₆H₁₀)-NH— | ...do... | Do. |
| 66 | (C₆H₁₁-C₆H₁₀)(NH—) | ...do... | Do. |
| 66a | (2-CH₃-C₆H₁₀)-NH— | C₆H₅-CH₂-CH(CH₃)-NH(CH₃)— | C₆H₅-CONH-CH₂OH |
| 66b | (decalinyl)-NH— | C₆H₅-CH₂CH₂-CH(CH₃)-NH— | Same as above. |
| 66c | C₆H₁₁-NH— | F-C₆H₄-CH₂-CH₂-CH(CH₃)-NH— | Do. |
| 66d | C₆H₁₁-NH | C₆H₅-C(CH₃)₂-CH(CH₃)-NH— | Do. |

EXAMPLE 67

A homogeneous mixture of 42.6 g. of the anthraquinone compound of the formula

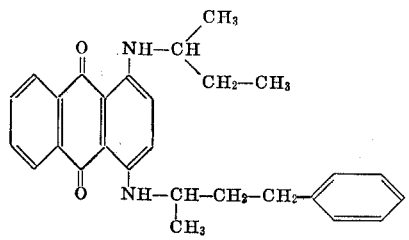

and 16.6 g. of N-methylol benzamide is added at a temperature of 5–10° to 450 g. of 90% sulphuric acid and the solution obtained is stirred for 24 hours at this temperature after which it is poured onto ice. Further working up and the sulphonation are performed as described in Example 1. The blue dyeings attained on nylon with this dyestuff of the formula

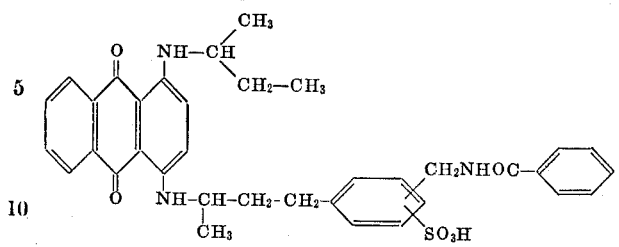

are very level and have good wet and light fastness properties.

The anthraquinone compound of the first formula given above is obtained by reacting 1-sec. butylamino-4-bromo-anthraquinone with 1-phenyl-3-aminobutane analogously to the process described in Example 1.

Further anthraquinone dyestuffs having similar properties which also dye synthetic polyamide fibres in fast blue shades are given in the following Table II. They are produced by reacting, according to Example 1, the 1-sec. alkylamino - 4 - aralkylamino-anthraquinone compounds given in column II with the N-methylol compounds given in column III and then sulphonating by the same method as is described in Example 1.

TABLE II

| No. | R | R' | N-methylol compounds |
|---|---|---|---|
| 68 | (CH₃)₂CH—NH— | C₆H₅—CH₂CH₂—CH(CH₃)—NH— | 2-Cl-C₆H₄—CONH—CH₂OH |
| 69 | Same as above | Same as above | 3-Cl-C₆H₄—CONH—CH₂OH |
| 70 | do | do | 3,4-Cl₂-C₆H₃—CONH—CH₂OH |
| 71 | do | do | 4-O₂N-C₆H₄—CONH—CH₂OH |
| 72 | do | do | 2-NO₂-C₆H₄—CONH—CH₂OH |
| 73 | do | do | 3-NO₂-C₆H₄—CONH—CH₂OH |
| 74 | do | do | 3-CH₃-4-NO₂-C₆H₃—CONH—CH₂OH |
| 75 | do | do | 2,4-(CH₃)₂-C₆H₃—CONH—CH₂OH |
| 76 | do | do | 2,3-(CH₃)₂-C₆H₃—CONH—CH₂OH |
| 77 | do | do | C₆H₅—CONH—CH₂OH |

TABLE II—Continued

| No. | R | R' | N-methylol compounds |
|---|---|---|---|
| 78 | do | do | ![phenyl]—CO—N(CH₃)—CH₂OH |
| 79 | do | do | $CH_3-CH_2-CONH-CH_2OH$ |
| 80 | do | do | $CH_3CH_2CH_2-CONH-CH_2OH$ |
| 81 | do | do | $CH_3$—[phenyl-Cl]—$CONH-CH_2OH$ |
| 82 | do | do | $CH_3CH_2CH_2CH_2-CONH-CH_2OH$ |
| 83 | do | do | $CH_3CH_2CH_2CH_2CH_2-CONH-CH_2OH$ |
| 84 | do | do | $CH_3CH_2-O-CONH-CH_2OH$ |
| 85 | do | do | [cyclohexyl with CH₃, H]—$CONH-CH_2OH$ |
| 86 | do | do | $CH_3CH_2CH_2-O-CONH-CH_2OH$ |
| 87 | do | do | $(CH_3)_2CH-O-CONH-CH_2OH$ |
| 88 | do | do | $CH_3CH_2CH_2CH_2-O-CONH-CH_2OH$ |
| 89 | do | do | $CH_3CH_2-CH(CH_3)-O-CONH-CH_2OH$ |
| 90 | do | do | $CH_3-C(CH_3)(CH_3)-CH_2-O-CONH-CH_2OH$ |
| 91 | do | do | $(CH_3)_2CH-CH_2-CH(CH_3)-OCONH-CH_2OH$ |
| 92 | do | do | [cyclohexyl, H]—$O-CONH-CH_2OH$ |
| 93 | do | do | $(CH_3)_3C$—[phenyl]—$CONH-CH_2OH$ |
| 94 | do | do | [phenyl-Br]—$CONH-CH_2OH$ |
| 95 | do | do | $CH_3-CO-N(CH_3)-CH_2OH$ |
| 96 | do | [phenyl]—$CH_2-CH(CH_3)-NH-$ | Cl,Cl-[phenyl]—$CONH-CH_2OH$ |
| 97 | do | [phenyl-Cl]—$CH_2-CH(CH_3)-NH-$ | [phenyl-Cl]—$CONH-CH_2OH$ |
| 98 | do | $Cl$—[phenyl]—$CH_2-CH(CH_3)-NH-$ | [phenyl]—$CONH-CH_2OH$ |
| 99 | do | [phenyl-CH₃]—$CH_2-CH(CH_3)-NH-$ | Same as above. |

TABLE II—Continued

| No. | R | R' | N-methylol compounds |
|-----|---|----|----|
| 100 | do | CH₃—C₆H₄—CH₂—CH(CH₃)—NH— | Do. |
| 101 | do | CH₃—C₆H₃(CH₃)—CH₂—CH(CH₃)—NH— | Do. |
| 102 | do | (OCH₃)C₆H₄—CH₂—CH(CH₃)—NH— | Do. |
| 103 | do | (Cl)C₆H₄—CH₂—CH(CH₂CH₃)—NH— | Do. |
| 104 | do | Cl—C₆H₄—CH₂—CH(CH₂CH₃)—NH— | Do. |
| 105 | do | (CH₃)C₆H₄—CH₂—CH₂—CH(CH₃)—NH— | Do. |
| 106 | do | (Br)C₆H₄—CH₂—CH(CH₂CH₃)—NH— | Do. |
| 107 | do | CH₃—C₆H₄—CH₂—CH(CH₃)—CH(CH₃)—NH— | Do. |
| 108 | do | C₂H₅O—C₆H₄—CH₂CH₂—CH(CH₃)—NH— | Do. |
| 109 | do | CH₃—C₆H₄—CH₂CH₂—CH(CH₃)—NH— | Do. |
| 110 | do | CH₃—C₆H₃(CH₃)—CH₂CH₂—CH(CH₃)—NH— | Do. |
| 111 | do | (Cl)C₆H₄—CH₂CH₂—CH(CH₃)—NH— | Do. |
| 112 | do | Cl—C₆H₄—CH₂CH₂—CH(CH₃)—NH— | Do. |
| 113 | do | (OCH₃)C₆H₄—CH₂CH₂—CH(CH₃)—NH— | Do. |
| 114 | do | C₆H₅—CH₂—CH(CH₃)—CH(CH₃)—NH— | Do. |

TABLE II—Continued

| No. | R | R' | N-methylol compounds |
|---|---|---|---|
| 115 | do | 2-CH₃-C₆H₄-CH₂-CH(CH₃)-CH(CH₃)-NH- | Do. |
| 116 | do | 2-Cl-C₆H₄-CH₂-CH(CH₃)-CH(CH₃)-NH- | Do. |
| 117 | do | 4-Cl-C₆H₄-CH₂-CH(CH₃)-CH(CH₃)-NH- | Do. |
| 118 | do | C₆H₅-CH₂-CH(CH₃)-CH(CH₂CH₃)-NH- | Do. |
| 119 | do | 2-Cl-C₆H₄-CH₂-CH(CH₃)-CH(CH₂CH₃)-NH- | Do. |
| 120 | do | C₆H₅-CH₂CH₂-CH(CH₂CH₃)-NH- | Do. |
| 121 | do | C₆H₅-C(CH₃)₂-CH₂-CH(CH₃)-NH- | Do. |
| 122 | do | 4-CH₃-C₆H₄-C(CH₃)₂-CH₂-CH(CH₃)-NH- | Do. |
| 123 | do | (3-CH₃, 4-CH₃)-C₆H₃-C(CH₃)₂-CH₂-CH(CH₃)-NH- | Do. |
| 124 | do | C₆H₅-CH₂CH₂-CH(CH₂CH(CH₃)₂)-NH- | Do. |
| 125 | do | 2-Cl-C₆H₄-CH₂CH₂-CH(CH₂CH(CH₃)₂)-NH- | Do. |
| 126 | (CH₃)(CH₃CH₂)CH-NH- | C₆H₅-CH₂-CH(CH₃)-NH- | 2,4-Cl₂-C₆H₃-CONH-CH₂OH |
| 127 | Same as above | 2-Cl-C₆H₄-CH₂-CH(CH₃)-NH- | 2-Cl-C₆H₄-CONH-CH₂OH |
| 128 | do | 4-Cl-C₆H₄-CH₂-CH(CH₃)-NH- | Same as above. |

TABLE II—Continued

| No. | R | R' | N-methylol compounds |
|---|---|---|---|
| 129 | do | 2-methylphenyl-CH₂-CH(CH₃)-NH- | Do. |
| 130 | do | 4-CH₃-C₆H₄-CH₂-CH(CH₃)-NH- | Do. |
| 131 | do | CH₃,CH₃-phenyl-CH₂-CH(CH₃)-NH- | Do. |
| 132 | do | 2-OCH₃-phenyl-CH₂-CH(CH₃)-NH- | Do. |
| 133 | do | phenyl-CH₂-CH(CH₂CH₃)-NH- | ⌬-CONH-CH₂OH |
| 134 | do | 2-Cl-phenyl-CH(CH₂CH₃)-NH- | Same as above. |
| 135 | do | 2-Br-phenyl-CH₂-CH(CH₂CH₃)-NH- | Do. |
| 136 | do | 4-Cl-C₆H₄-CH₂-CH(CH₂CH₃)-NH- | Do. |
| 137 | do | 2-CH₃-phenyl-CH₂CH₂-CH(CH₃)-NH- | Do. |
| 138 | do | 4-CH₃-C₆H₄-CH₂CH₂-CH(CH₃)-NH- | Do. |
| 139 | do | CH₃,CH₃-phenyl-CH₂CH₂-CH(CH₃)-NH- | Do. |
| 140 | do | 2-Cl-phenyl-CH₂CH₂-CH(CH₃)-NH- | Do. |
| 141 | do | 4-Cl-C₆H₄-CH₂CH₂-CH(CH₃)-NH- | Do. |
| 142 | do | 2-OCH₃-phenyl-CH₂CH₂-CH(CH₃)-NH- | Do. |
| 143 | do | phenyl-CH₂-CH(CH₃)-CH(CH₃)-NH- | Do. |

TABLE II—Continued

Structure: 1,4-disubstituted anthraquinone with R at position 1 and R' at position 4.

| No. | R | R' | N-methylol compounds |
|---|---|---|---|
| 144 | do | 2-CH₃-C₆H₄-CH₂-CH(CH₃)-CH(CH₃)-NH- | Do. |
| 145 | do | 4-CH₃-C₆H₄-CH₂-CH(CH₃)-CH(CH₃)-NH- | Do. |
| 146 | do | 4-C₂H₅O-C₆H₄-CH₂CH₂-CH(CH₃)-NH- | Do. |
| 147 | do | 2-Cl-C₆H₄-CH₂-CH(CH₃)-CH(CH₃)-NH- | Do. |
| 148 | do | 4-Cl-C₆H₄-CH₂-CH(CH₃)-CH(CH₃)-NH- | Do. |
| 149 | do | C₆H₅-CH₂-CH(CH₃)-CH(CH₂CH₃)-NH- | Do. |
| 150 | do | 2-Cl-C₆H₄-CH₂-CH(CH₃)-CH(CH₂CH₃)-NH- | Do. |
| 151 | do | C₆H₅-CH₂CH₂-CH(CH₂CH₃)-NH- | Do. |
| 152 | do | C₆H₅-C(CH₃)₂-CH₂-CH(CH₃)-NH- | Do. |
| 153 | do | 4-CH₃-C₆H₄-C(CH₃)₂-CH₂-CH(CH₃)-NH- | Do. |
| 154 | do | 3,4-(CH₃)₂-C₆H₃-C(CH₃)₂-CH₂-CH(CH₃)-NH- | Do. |
| 155 | do | C₆H₅-CH₂CH₂-CH(CH₂-CH(CH₃)₂)-NH- | Do. |
| 156 | do | 2-Cl-C₆H₄-CH₂CH₂-CH(CH₂-CH(CH₃)₂)-NH- | Do. |
| 157 | (CH₃CH₂)(CH₃CH₂)CH-NH- | C₆H₅-CH₂-CH(CH₃)-CH(CH₃)-NH- | Do. |
| 158 | (CH₃)₂CH-CH(CH₃)-NH- | do | Do. |

TABLE II—Continued

| No. | R | R' | N-methylol compounds |
|---|---|---|---|
| 159 | (CH₃)₂CH—CH₂—CH(CH₃)—NH— | C₆H₅—CH₂CH₂—CH(CH₃)—NH— | Do. |
| 159a | C₆H₁₁—NH— | ....do.... | H₃C—C(CH₃)₂—CONH—CH₂OH |
| 159b | Same as above | ....do.... | H₃C—C(CH₃)₂—CH₂—C(CH₃)₂—CONH—CH₂OH |
| 159c | ....do.... | ....do.... | H₃C—CH(CH₃)—CH(CH(CH₃)₂)—CONH—CH₂OH |
| 159d | (H₃C)₂CH—NH— | ....do.... | H₃C—(CH₂)₁₁—CONH—CH₂OH |

EXAMPLE 160

A mixture consisting of 19.3 g. of 1-(N-acetyl-N-isopropylamino)-4-bromo-anthraquinone and 16.2 g. of 1-phenyl-3-aminobutane is stirred for 20 hours at a temperature of 110°. The red melt obtained is then poured onto a mixture of 200 g. of ice and 200 ml. of 2 N HCl whereupon the compound of the formula

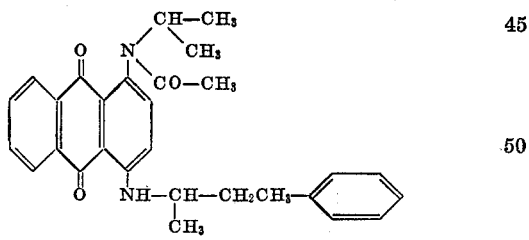

separates as a red resin. The aqueous hydrochloric acid phase is decanted and the intermediate product formed is dissolved in 100 ml. of 80% sulphuric acid. This solution is stirred for 8 hours at a temperature of 50° and is then poured onto ice, whereupon the compound of the formula

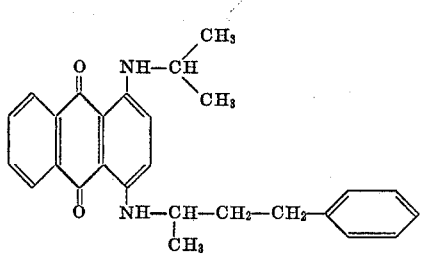

precipitates. It is purified by recrystallisation from n-butanol.

A homogeneous mixture of 41.2 g. of this compound and 16.6 g. of N-methylol benzamide is added to 300 g. of 96% sulphuric acid at 0–5° and the solution is stirred for 24 hours at this temperature. The temperature is then raised to 23° and 130 g. of 66% oleum are added. The solution is stirred for another 6 hours at 23–25° and then poured onto ice. Working up is performed analogously to Example 1.

A dyestuff of the formula

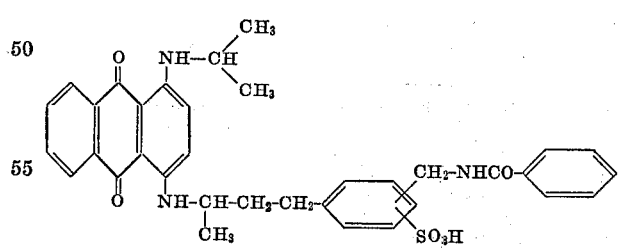

is obtained which dyes nylon from a weakly acid bath in very brilliant blue shades which have very good evenness. The dyeings have good fastness both to light and wet.

Further anthraquinone dyestuffs have similar properties which also dye synthetic polyamide fibres in fast blue shades are given in the following Table 3. They are obtained by saponifying, as described in Example 160, the 1-(N-acyl-N-sec. alkylamino)-4-aralkylamino-anthraquinone compounds given in column II, reacting with the N-methylol compounds given in column III and finally sulphonating in the same way as described in Example 160.

TABLE III

| No. | R | R' | N-methylol compounds |
|---|---|---|---|
| 161 | CH₃–CH(CH₃)–N(CH₃CO)– | C₆H₅–CH₂–CH(CH₃)–NH– | C₆H₅–CONH–CH₂OH |
| 162 | Same as above | 2-Cl-C₆H₄–CH₂–CH(CH₃)–NH– | Same as above. |
| 163 | do | 4-Cl-C₆H₄–CH₂–CH(CH₃)–NH– | Do. |
| 164 | do | 2-CH₃-C₆H₄–CH₂–CH(CH₃)–NH– | Do. |
| 165 | do | 4-CH₃-C₆H₄–CH₂–CH(CH₃)–NH– | Do. |
| 166 | do | 3,4-(CH₃)₂-C₆H₃–CH₂–CH(CH₃)–NH– | Do. |
| 167 | do | 2-OCH₃-C₆H₄–CH₂–CH(CH₃)–NH– | Do. |
| 168 | do | C₆H₅–CH₂–CH(CH₂CH₃)–NH– | Do. |
| 169 | do | 2-Cl-C₆H₄–CH₂–CH(CH₂CH₃)–NH– | Do. |
| 170 | do | 2-Br-C₆H₄–CH₂–CH(CH₂CH₃)–NH– | Do. |
| 171 | do | 4-Cl-C₆H₄–CH₂–CH(CH₂CH₃)–NH– | Do. |
| 172 | do | 2-CH₃-C₆H₄–CH₂CH₂–CH(CH₃)–NH– | Do. |
| 173 | do | 4-CH₃-C₆H₄–CH₂CH₂–CH(CH₃)–NH– | Do. |
| 174 | do | 3,4-(CH₃)₂-C₆H₃–CH₂CH₂–CH(CH₃)–NH– | Do. |
| 175 | do | 2-Cl-C₆H₄–CH₂CH₂–CH(CH₃)–NH– | Do. |

TABLE III—Continued

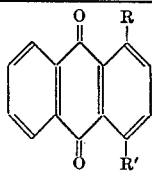

| No. | R | R' | N-methylol compounds |
|---|---|---|---|
| 176 | do | Cl—C6H4—CH2CH2—CH(CH3)—NH— | Do. |
| 177 | do | (2-OCH3)C6H4—CH2CH2—CH(CH3)—NH— | Do. |
| 178 | do | C6H5—CH2—CH(CH3)—CH(CH3)—NH— | Do. |
| 179 | do | (2-CH3)C6H4—CH2—CH(CH3)—CH(CH3)—NH— | Do. |
| 180 | do | CH3—C6H4—CH2—CH(CH3)—CH(CH3)—NH— | Do. |
| 181 | do | C2H5O—C6H4—CH2CH2—CH(CH3)—NH— | Do. |
| 182 | do | (2-Cl)C6H4—CH2—CH(CH3)—CH(CH3)—NH— | Do. |
| 183 | do | Cl—C6H4—CH2—CH(CH3)—CH(CH3)—NH— | Do. |
| 184 | do | C6H5—CH2—CH(CH3)—CH(CH2CH3)—NH— | Do. |
| 185 | do | (2-Cl)C6H4—CH2—CH(CH3)—CH(CH2CH3)—NH— | Do. |
| 186 | do | C6H5—CH2CH2—CH(CH2CH3)—NH— | Do. |
| 187 | do | C6H5—C(CH3)2—CH2—CH(CH3)—NH— | Do. |
| 188 | do | CH3—C6H4—C(CH3)2—CH2—CH(CH3)—NH— | Do. |
| 189 | do | CH3—(CH3)C6H3—C(CH3)2—CH2—CH(CH3)—NH— | Do. |
| 190 | do | C6H5—CH2CH2—CH(CH2—CH(CH3)2)—NH— | Do. |

3,499,915

TABLE III—Continued

[Anthraquinone structure with R at position 1 and R' at position 4]

| No. | R | R' | N-methylol compounds |
|---|---|---|---|
| 191 | do | 2-Cl-C₆H₄-CH₂CH₂-CH(CH₂CH(CH₃)₂)-NH- | Do. |
| 192 | (CH₃)(CH₃CH₂)CH-N(CH₃)-CO- | C₆H₅-CH₂-CH(CH₃)-NH- | Do. |
| 193 | Same as above | C₆H₅-CH₂-CH(CH₃)-NH- | 2-Cl-C₆H₄-CONH-CH₂OH |
| 194 | do | 2-Cl-C₆H₄-CH₂-CH(CH₃)-NH- | C₆H₅-CONH-CH₂OH |
| 195 | do | 4-Cl-C₆H₄-CH₂-CH(CH₃)-NH- | Same as above. |
| 196 | do | 2-CH₃-C₆H₄-CH₂-CH(CH₃)-NH- | 2,4-Cl₂-C₆H₃-CONH-CH₂OH |
| 197 | do | 4-CH₃-C₆H₄-CH₂-CH(CH₃)-NH- | Same as above. |
| 198 | do | 3,4-(CH₃)₂-C₆H₃-CH₂-CH(CH₃)-NH- | 2-Cl-C₆H₄-CONH-CH₂OH |
| 199 | do | 2-OCH₃-C₆H₄-CH₂-CH(CH₃)-NH- | Do. |
| 200 | do | C₆H₅-CH₂-CH(C₂H₅)-NH- | Do. |
| 201 | do | 2-Cl-C₆H₄-CH₂-CH(C₂H₅)-NH- | Do. |
| 202 | do | 2-Br-C₆H₄-CH₂-CH(C₂H₅)-NH- | Do. |
| 203 | do | 2-Cl-C₆H₄-CH₂-CH(CH₃)-CH(CH₃)-NH- | C₆H₅-CONH-CH₂OH |
| 204 | do | 4-Cl-C₆H₄-CH₂-CH(CH₃)-CH(CH₃)-NH- | Same as above. |

TABLE III—Continued

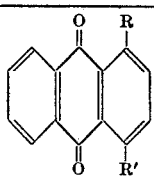

| No. | R | R' | N-methylol compounds |
|---|---|---|---|
| 205 | do | ⟨phenyl⟩-CH₂-CH(CH₃)-CH(CH₂CH₃)-NH- | Do. |
| 206 | do | ⟨2-Cl-phenyl⟩-CH₂-CH(CH₃)-CH(CH₂CH₃)-NH- | Do. |
| 207 | do | ⟨phenyl⟩-CH₂CH₂-CH(CH₂CH₃)-NH- | Do. |
| 208 | do | ⟨phenyl⟩-C(CH₃)₂-CH₂-CH(CH₃)-NH- | Do. |
| 209 | do | CH₃-⟨phenyl⟩-C(CH₃)₂-CH₂-CH(CH₃)-NH- | Do. |
| 210 | do | CH₃-⟨2-CH₃-phenyl⟩-C(CH₃)₂-CH₂-CH(CH₃)-NH- | Do. |
| 211 | do | ⟨phenyl⟩-CH₂CH₂-CH(NH-)-CH₂-CH(CH₃)₂ | Do. |
| 212 | do | ⟨2-Cl-phenyl⟩-CH₂CH₂-CH(NH-)-CH₂-CH(CH₃)₂ | Do. |
| 213 | do | Cl-⟨phenyl⟩-CH₂-CH(CH₂CH₃)-NH- | Do. |
| 214 | do | ⟨2-CH₃-phenyl⟩-CH₂CH₂-CH(CH₃)-NH- | Do. |
| 215 | do | CH₃-⟨phenyl⟩-CH₂CH₂-CH(CH₃)-NH- | Do. |
| 216 | do | CH₃-⟨2-CH₃-phenyl⟩-CH₂CH₂-CH(CH₃)-NH- | Do. |
| 217 | do | ⟨2-Cl-phenyl⟩-CH₂CH₂-CH(CH₃)-NH- | Do. |
| 218 | do | Cl-⟨phenyl⟩-CH₂CH₂-CH(CH₃)-NH- | Do. |
| 219 | do | ⟨2-OCH₃-phenyl⟩-CH₂CH₂-CH(CH₃)-NH- | Do. |

TABLE III—Continued

| No. | R | R' | N-methylol compounds |
|---|---|---|---|
| 220 | do | C₆H₅–CH₂–CH(CH₃)–CH(CH₃)–NH– | Do. |
| 221 | do | (2-CH₃-C₆H₄)–CH₂–CH(CH₃)–CH(CH₃)–NH– | Do. |
| 222 | do | CH₃–C₆H₄–CH₂–CH(CH₃)–CH(CH₃)–NH– | Do. |
| 223 | do | C₂H₅O–C₆H₄–CH₂CH₂–CH(CH₃)–NH– | Do. |
| 224 | (CH₃CH₂)₂CH–N(COCH₃)– | C₆H₅–CH₂CH₂–CH(CH₃)–NH– | 2-Cl-C₆H₄–CONH–CH₂OH |
| 225 | (CH₃)₂CH–CH(CH₃)–N(COCH₃)– | Same as above | Same as above. |
| 226 | CH₃CH₂CH₂–CH(CH₃)–N(SO₂-C₆H₄-CH₃)– | do | Do. |
| 227 | (CH₃)₂CH–CH(CH₃)–CH(CH₃)–N(COCH₃)– | do | C₆H₅–CONH–CH₂OH |
| 228 | (CH₃)(CH₃CH)–CH(CH₃)–N(COC₆H₅)– | do | 4-Cl-C₆H₄–CONH–CH₂OH |
| 229 | (CH₃)₂CH–N(SO₂CH₃)– | C₆H₅–CH₂–CH(CH₃)–CH(CH₃)–NH– | C₆H₅–CONH–CH₂OH |
| 229a | C₆H₅(H)–NH– | C₆H₁₁–CH₂–CH₂–CH(CH₃)–NH– | 2-OCH₃-C₆H₄–CONH–CH₂OH |
| 229b | Same as above | Same as above | 2-OC₂H₅-C₆H₄–CONH–CH₂OH |

EXAMPLE 250

45.4 g. of anthraquinone compound of the formula

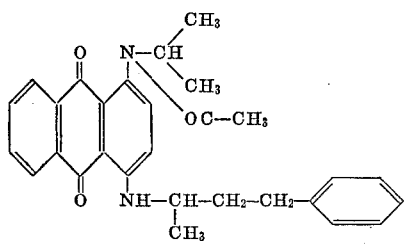

(obtained according to Example 160) are added to 180 g. of monohydrate at 25° and the whole is stirred for 6 hours at this temperature whereupon sulphonation occurs. 80 ml. of water are so added dropwise that the temperature does not rise above 80° and the solution is stirred for 3 hours at 80° whereupon the acetyl group is split off. The solution is poured onto a mixture of ice and sodium chloride and the anthraquinone compound of the formula

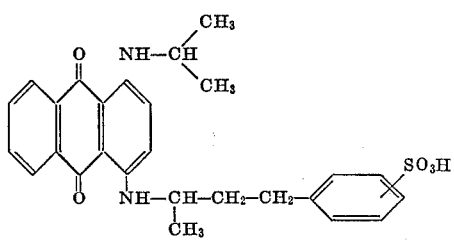

is isolated in the usual way and dried.

The sulphonated anthraquinone derivative so obtained is mixed with 17.3 g. of N-methylol cyclohexane carboxylic acid amide and the mixture is added at 25° to 200 g. of 18% oleum. The whole is stirred for 15 hours at the same temperature whereupon the solution is poured onto a mixture of ice and sodium chloride. Further working up is performed as described in Example 1.

The dyestuff so obtained of the formula

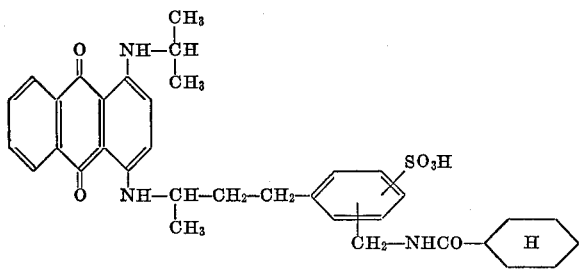

dyes nylon from a weakly acid bath a blue colour. The dyeings obtained have good fastness to wet and light.

EXAMPLE 251

A mixture of 54 g. of the compound of the formula

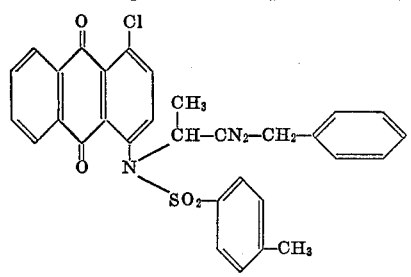

(obtained by reacting the corresponding 1-chloro-4-aralkylaminoanthraquinone compound with p-toluene sulphochloride), 30 g. of 2-amino-3-methylbutane and 100 ml. of n-butanol are stirred in an autoclave for 24 hours at a temperature of 110° whereupon the reaction mixture is subjected to steam distillation. The residue, a red resin, is added to 600 g. of 80% sulphuric acid and the solution is then stirred for 10 hours at a temperature of 60° whereupon the tosyl radical is split off. The solution is poured onto ice, the precipitated product is filtered off and recrystallised from n-butanol. The product so obtained has the formula

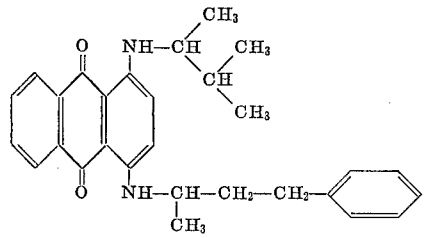

If, with otherwise the same procedure, instead of the above 1 - chloro-4-(N-aralkyl-N-p-tolylsulphonylamino)-anthraquinone compound, equivalent amounts of the 1-halogen - 4 - (N - acyl-N-aralkylamino)-anthraquinones given in the following Table V and 30 g. of 2-amino-3-methylbutane are used, then the 1-sec. alkylamino-4-aralkylamino-anthraquinone compound of the above formula is also obtained.

TABLE V

No.

252 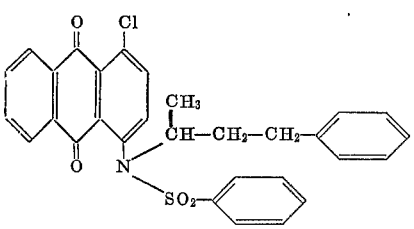

253 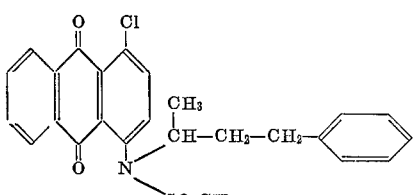

254 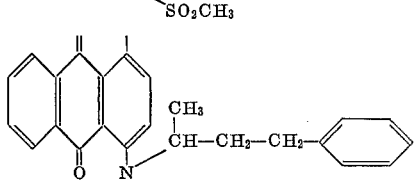

255 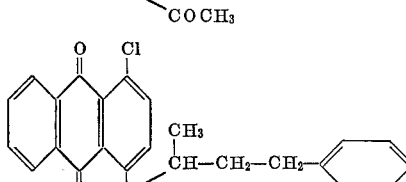

256 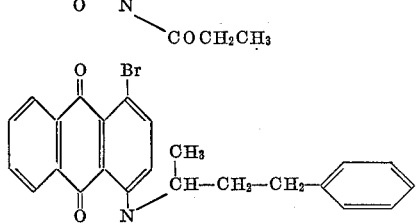

44 g. of the 1-sec. alkylamino-4-aralkylamino-anthraquinone compound obtained in Examples 251–256 are condensed as described in Example 1 with 16.6 g. of N-

TABLE III—Continued

| No. | R | R' | N-methylol compounds |
|---|---|---|---|
| 229c | do | do | ⟨H⟩—CONH—CH₂OH |
| 229d | do | do | ⟨H⟩(CH₃)—CONH—CH₂OH |
| 229e | (H₃C)₂CH—NH— | do | ⟨H⟩—⟨H⟩—CONH—CH₂OH |
| 229f | Same as above | do | ⟨H H⟩—CONH—CH₂OH |

EXAMPLE 230

16.3 g. of benzonitrile and 0.1 g. of hydroquinone are dissolved in 65 g. of 93% sulphuric acid at 20°, this solution is stirred for 3 hours at a temperature of 33–35°, then cooled to 10–12°, 7.5 g. of α,α'-dichlorodimethyl ether are added dropwise within 1 hour and finally the mixture is stirred, first for 3 hours at 10–12° and then for 4 hours at 13–15°.

350 g. of 90% sulphuric acid are then added to this solution after which, at a temperature of 5–10°, 42.5 g. of the compound of the formula

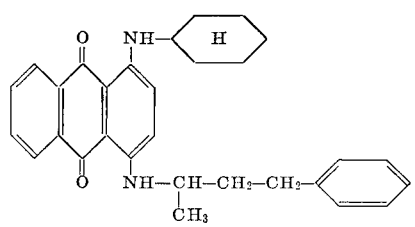

are added. The mixture is stirred for 24 hours at this temperature and then poured onto ice. The condensation product is filtered off, washed neutral with water and then dried in vacuo at 60°. Sulphonation is performed in 6% oleum for 6 hours at 23–25° as described in Example 1. The dyestuff obtained is identical with that described in Example 1.

If instead of the anthraquinone compound of the above formula, with otherwise the same procedure, the equivalent amount of one of the 1-cycloalkylamino-5-aralkyl-aminoanthraquinone compounds given in column II of Table I is used, or if one of the 1-sec. alkylamino-4-aralkylaminoanthraquinone compounds given in column II of Table II is used, then dyestuffs having similar properties are obtained.

End products having similar properties are also obtained if, with otherwise the same procedure, the equivalent amount of one of the nitriles or corresponding carboxylic acid amides given in the following Table IV is used instead of benzonitrile.

TABLE IV

| No. | |
|---|---|
| 231 | ⟨ ⟩—CONH₂ |
| 232 | ⟨Cl⟩—CONH₂ (Cl ortho) |
| 233 | Cl—⟨ ⟩—CONH₂ |
| 234 | Cl—⟨Cl⟩—CONH₂ |
| 235 | O₂N—⟨ ⟩—CONH₂ |
| 236 | ⟨HO₂⟩—CONH₂ |
| 237 | ⟨NO₂⟩—CONH₂ |
| 238 | CH₃—⟨NO₂⟩—CONH₂ |
| 239 | CH₃—CN |
| 240 | CH₃—CONH₂ |
| 241 | CH₃—CH₂—CN |
| 242 | CH₃—CH₂—CH₂—CONH₂ |
| 243 | ⟨H⟩—CONH₂ |
| 244 | CH₃—CH₂—O—CONH₂ |
| 245 | CH₃—CH₂—CH₂—O—CONH₂ |
| 246 | (CH₃)₂CH—O—CONH₂ |
| 247 | CH₃—CH₂—CH₂—CH₂—O—CONH₂ |
| 248 | CH₃—CH₂—CH(CH₃)—O—CONH₂ |
| 249 | ⟨H⟩—O—CONH₂ | methylol benzamide and then sulphonated with 6% oleum at 25°. The dyestuff so obtained of the formula

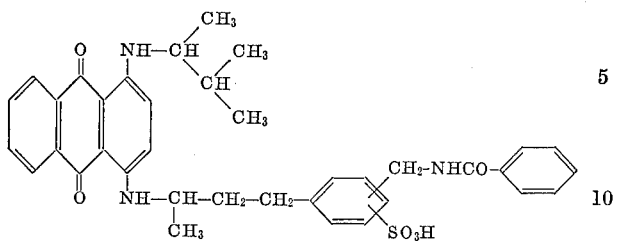

has properties similar to that described in Example 1.

EXAMPLE 257

10 g. of nylon fabric are introduced into a 40° warm dyebath which contains, in 500 ml. of water, 0.20 g. of the dyestuff according to Example 1, 0.25 g. of sulphated ricinoleic acid butyl ester and 0.20 g. of 40% acetic acid. The temperature is brought evenly to the boil within 30 minutes whereupon dyeing is performed for 1 hour at the light boil. The goods are then rinsed and dried. A very level brilliant blue dyeing is obtained which has very good fastness to light and good fastness to water, washing and perspiration.

EXAMPLE 258

10 g. of "Nyltest" nylon fabric are entered into a laboratory scale beam dyeing apparatus which contains 0.20 g. of the dyestuff according to Example 1, 0.30 g. of ammonium sulphate and 0.20 g. of the reaction product of a higher molecular amine with 20 mols of ethylene oxide in 400 ml. of liquor and then the apparatus is closed. The temperature of the liquor is then evenly brought to 130° within 30 minutes and dyeing is performed at this temperature for another 30 minutes. After cooling, the fabric is taken from the apparatus, rinsed and dried. A level, brilliant blue dyeing having good fastness to light and good wet fastness properties, particularly good fastness to water, washing and perspiration, is obtained.

We claim:
1. A dyestuff of the formula

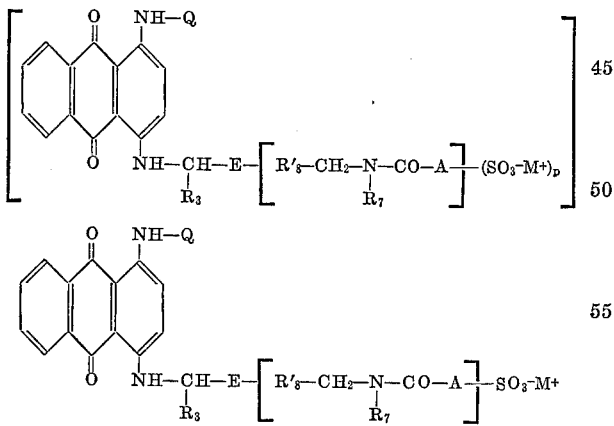

wherein
Q represents secondary alkyl of at most 6 carbon atoms, cyclopentyl, cyclohexyl, lower alkylcyclopentyl, lower alkylcyclohexyl, dodecahydrodiphenyl or decahydronaphthyl, $R_3$ represents an alkyl group of at most 11 carbon atoms or cyclohexyl, $R_7$ represents hydrogen or lower alkyl, $R'_8$ represents a benzene radical which is further substituted by hydrogen, lower alkyl, lower alkoxy, fluorine, bromine or chlorine, E represents alkylene of from 1 to 4 carbon atoms, A represents alkyl of at most 12 carbon atoms, cyclopentyl, cyclohexyl, lower alkyl-cyclopentyl, lower alkyl-cyclohexyl, dodecahydrodiphenyl, decahydronaphthyl, alkoxy of at most 6 carbon atoms, cyclohexyloxy, or a phenyl radical any substituent of which, apart from any $SO_3^-M^+$ group present therein, is selected from chlorine, bromine, lower alkyl, lower alkoxy or nitro, and $M^+$ represents the equivalent of a colourless cation, the $SO_3^-M^+$ group being bonded to an aromatic ring carbon atom.

2. A dyestuff as defined in claim 1, wherein
the grouping $—SO_3^-M^+$ is linked to $R'_8$, and represents alkyl of at most 4 carbon atoms.

3. A dyestuff as defined in claim 2, wherein
Q represents isopropyl, sec-butyl or cyclohexyl,
$R_3$ represents lower alkyl,
$R_7$ represents hydrogen,
$R_8'$ represents a trivalent benzene radical bearing no further substituents,
E represents alkylene of at most 4 carbon atoms, and
A represents phenyl, chlorophenyl or lower alkylphenyl.

4. A dyestuff as defined in claim 3, wherein E represents ethylene.

5. A dyestuff as defined in claim 3, wherein E represents ethylene and —CO—A is benzoyl or p-(t-butyl)-benzoyl.

6. A dyestuff as defined in claim 5, wherein Q represents cyclohexyl, $R_3$ represents methyl and —CO—A is benzoyl.

7. A dyestuff as defined in claim 5, wherein Q represents isopropyl, $R_3$ is methyl, and —CO—A is p-(t-butyl)-benzoyl.

8. A dyestuff as defined in claim 5, wherein Q is sec-butyl, $R_3$ is methyl and —CO—A is p-(t-butyl)-benzoyl.

9. A dystuff as defined in claim 4, wherein Q is cyclohexyl, $R_3$ is methyl and A is 2-chlorophenyl.

10. A dyestuff as defined in claim 4, wherein Q is cyclohexyl, $R_3$ is methyl and A is 2,4-dichloro-phenyl.

References Cited

UNITED STATES PATENTS 3,320,287   5/1967   Schwander _____ 260—372

LORRAINE A. WEINBERGER, Primary Examiner

H. C. WEGNER, Assistant Examiner

U.S. Cl. X.R.

8—39, 40; 260—268, 272, 294.9, 371, 376, 377, 404, 378, 381, 465, 465.4, 465.6, 465.7, 482, 557, 558, 559, 561, 570.8

PO-1050
(5/69)

UNITED STATES PATENT OFFICE
CERTIFICATE OF CORRECTION

Patent No. 3499515  Dated March 10, 1970

Inventor(s) MICHAEL E. MIKRUT

It is certified that error appears in the above-identified patent and that said Letters Patent are hereby corrected as shown below:

Column 2, line 7:
"prevailing" should be -- preventing --

Column 2, line 72:
"4 to" should be -- 4. To --

Column 3, line 67:
"reain" should be -- retain --

Column 4, line 67:
"and" should be -- an --

SIGNED AND SEALED

JUL 28 1970

(SEAL)
Attest:

Edward M. Fletcher, Jr.
Attesting Officer

WILLIAM E. SCHUYLER, JR.
Commissioner of Patents